United States Patent
Thye

(10) Patent No.: US 10,621,633 B2
(45) Date of Patent: *Apr. 14, 2020

(54) SYSTEMS AND METHODS FOR RESOURCE UTILIZATION MANAGEMENT

(71) Applicant: BAU LLC, San Francisco, CA (US)

(72) Inventor: John Frederick Thye, San Francisco, CA (US)

(73) Assignee: BAU LLC, San Francisco, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/792,532

(22) Filed: Oct. 24, 2017

(65) Prior Publication Data

US 2018/0047075 A1    Feb. 15, 2018

Related U.S. Application Data

(63) Continuation of application No. 14/525,869, filed on Oct. 28, 2014, now Pat. No. 9,830,624.

(51) Int. Cl.
  *G06Q 30/04* (2012.01)
  *H04L 12/911* (2013.01)
  *G06Q 10/02* (2012.01)

(52) U.S. Cl.
  CPC .......... *G06Q 30/04* (2013.01); *H04L 47/822* (2013.01)

(58) Field of Classification Search
  USPC .......................................................... 705/34
  See application file for complete search history.

(56) References Cited

U.S. PATENT DOCUMENTS

| 7,496,652 B2* | 2/2009 | Pezzutti ............... H04L 41/065 709/217 |
| 2009/0082015 A1 | 3/2009 | Ravi et al. |
| 2010/0169489 A1* | 7/2010 | Akiyama .............. G06F 9/5061 709/226 |

(Continued)

FOREIGN PATENT DOCUMENTS

WO    2014140183 A2    9/2014

OTHER PUBLICATIONS

International Search Report related to PCT/US2015/61176, dated Feb. 1, 2016.
Written Opinion related to PCT/US2015/61176, dated Feb. 1, 2016.

*Primary Examiner* — Garcia Ade
(74) *Attorney, Agent, or Firm* — Dergosits & Noah LLP

(57) ABSTRACT

Systems and methods which provide resource utilization management, such as with respect to resources available through one or more accessible resource facilities, are disclosed. Embodiments provide resource utilization management systems and methods which facilitate user controlled reservation, access, and accounting for resource utilization. Resource utilization management systems of embodiments implement an electronic user key based infrastructure to enable access to and accounting for resources, such as resources of one or more accessible resource facility. Embodiments comprise unique tags for each resource for which resource utilization management is provided. A user device, such as a smart phone, personal digital assistant (PDA), or tablet computer, executing a resource utilization management application may be configured to provide a resource key device which is operable to scan the unique tag of a resource for accessing and relinquishing that resource, whether on an ad hoc and/or reservation basis.

18 Claims, 5 Drawing Sheets

(56) References Cited

U.S. PATENT DOCUMENTS

| | | | |
|---|---|---|---|
| 2013/0093563 A1* | 4/2013 | Adolfsson | G07C 9/00031 340/5.7 |
| 2014/0124570 A1 | 5/2014 | Franklin | |
| 2015/0112738 A1* | 4/2015 | Marinaro | G06Q 10/02 705/5 |

* cited by examiner

SYSTEMS AND METHODS FOR RESOURCE UTILIZATION MANAGEMENT

CROSS-REFERENCE

This application is a continuation of U.S. patent application Ser. No. 14/525,869 entitled Systems and Methods for Resource Utilization Management, filed Oct. 28, 2014, which is incorporated herein by reference in its entirety.

TECHNICAL FIELD

The present invention relates generally to resource utilization management and, more particularly, to techniques for managing the reservation of, access to, accounting and/or payment for various resources such as may be made available through one or more accessible resource facility.

BACKGROUND OF THE INVENTION

A number of different space resources have been made available to various users in the past. Such space resources have included shared space resources which are accessible to a number of unaffiliated users simultaneously and exclusive space resources which, although being available for use by any number of unaffiliated users, are only accessible to a particular user at any particular point in time. Management of the utilization of such resources has, however, not been robust.

For example, corporate and airline lounges provide shared space resources which have often been made available to users at locations throughout the world. However, the access to such shared spaces has typically been membership based, whereby membership is required for entry into the lounge premises. A member user may thus present credentials to a receptionist or other gatekeeper and be permitted access to the lounge on an ad hoc basis. Once permitted access, the user is typically permitted complete access to the shared space facilities. Thus, the membership charges for access to the resource are generally based upon a "one-size-fits-all" pricing model (e.g., an annual membership fee, a monthly membership fee, or a daily access fee), typically determined based upon the average or expected utilization of the shared space resource and its amenities. Accordingly, although a user may be required to separately pay for certain items purchased at a point of sale within the shared space resource (e.g., beverages or meals consumed by the user), a user is not enabled to pay for only those aspects of the shared space resource that the user actually avails him/herself of.

Although an operator of a shared space resource may be able to track a user entering the space, such as through the aforementioned presentation of credentials, the operator is often unable to track the user's exit. For example, the presentation of credentials for access is cumbersome enough that user's will not tolerate a similar process upon departing the space resource. Moreover, even when a user's entrance and exit of the space resource are captured, present solutions fail to provide information regarding the users' behavior within the space resource (e.g., the particular areas of the space which are utilized, the amenities the user does/does not avail themselves of, etc.). Accordingly, the operator of the space resource is provided with little information regarding the actual use of the space resource and its amenities by the users.

As another example, meeting rooms are often provided by hotels and airport fixed base operators (FBOs), whereby a user may have exclusive access to the space resource for some period of time. The reservation and access process, however, is typically tedious and limited. For example, a user must often call and speak with a customer service agent, or engage in an email exchange, to determine the availability of the space resource, provide payment information to reserve the space, and then manually check in with a customer service agent, often again providing the payment information, upon arrival at the space.

Although some providers of such exclusive access space resources have provided some level of automation for reserving a space resource, such attempts are generally limited to a simple calendar for a particular space resource showing its reserved/open times. The user may be enabled to select a time for their reservation and denote that on the calendar. However, if the desired time is not available the user must generally manually select another space resource (if one is even offered) to determine if the desired time is available. Moreover, the user of such a space resource calendar must typically still manually check in with a customer service agent upon arrival at the space.

Moreover, although a user may be provided exclusive use of the space resource, the user is nevertheless not charged only for their utilization of that space resource. For example, a user is typically charged based upon their reservation of the space resource (e.g., a number of hours or days that the user reserved the meeting room for their exclusive use), rather than the actual time that they availed themselves of the space resource. Accordingly, if a user relinquishes the space resource prior to the end of their reservation the user is charged for the entire time of the reservation. This is often despite another user being ready and willing to utilize that space resource. This result may stem from the often cumbersome and generally slow process by which the utilization of the space resource is managed, whereby the first user's relinquishment of the space and the second user's desire to utilize the space are not able to be identified and connected in time to facilitate the transition in use of the space resource.

Existing solutions have been unable to satisfactorily provide for ad hoc utilization of exclusive space resources. That is, although shared space resources, wherein a large number of users are permitted to simultaneously utilize the space resource, enable users to access the space resource on an spontaneous, ad hoc basis, exclusive space resources are generally most effectively utilized via prior reservation of the space resource. For example, the process of determining availability of the space resource (e.g., due to upcoming reservations by other users), blocking a time period for an ad hoc user, implementing a payment methodology, and granting physical access to the space resource often discourages many casual, ad hoc uses (e.g., spontaneous uses of an hour or less) of the space.

BRIEF SUMMARY OF THE INVENTION

The present invention is directed to systems and methods which provide resource utilization management, such as with respect to resources available through one or more accessible resource facility. Embodiments of the invention facilitate the management of reservations, access, accounting and/or payment for various resources. The resources managed according to embodiments may comprise any number or combination of shared resources, including shared space resources (e.g., lounges, libraries, gathering halls, common use areas, etc.), shared use resources (e.g., network printers, network scanners, network access, etc.), exclusive space resources (e.g., cubical, private offices, conference rooms, bathing facilities, etc.), and exclusive use resources (e.g., photocopiers, overhead projectors, video conference equipment, personal computing equipment, etc.).

Embodiments of the present invention provide resource utilization management systems and methods which facilitate user controlled reservation, access, and accounting for resource utilization. The reservation functionality provided according to embodiments provides identification of available resources meeting a user's needs or desires, including determining particular resources (such as by resource class and/or resource attributes) and times available to the user, and for establishing ownership of the resources for a period of utilization by the user. The access functionality provided according to embodiments provides user initiated access with respect to reserved resources as well as ad hoc resource access. Such access may be provided with respect to free zones (e.g., zones for which no user fee is incurred) and/or paid zones (e.g., zones for which a user fee is incurred). The access functionality of embodiments provides for simultaneous access of a plurality of resources by a particular user, including nested resource access (e.g., access to resources within resources) and parallel resource access (e.g., access to two or more separate resources), as well as simultaneous access by a plurality of users. The accounting functionality provided according to embodiments provides for tracking user's actual utilization of resources, including free zone resources, paid zone resources, shared space resources, shared use resources, exclusive space resource, exclusive use resources, and nested resources. Additionally or alternatively, the accounting functionality provided according to embodiments facilitates flexible, dynamic, and/or unique pricing for resource utilization, such as based upon the particular resource, the particular user, the particular time of use, particular location of use, rewards based incentives, etc. Embodiments of the accounting functionality provide for a single payment process upon a user exiting or otherwise relinquishing use of a last paid zone, such as a highest level paid zone resource (e.g., a first paid zone accessed/last paid zone relinquished, an outermost paid zone of a nested group of paid zones accessed, or a paid zone providing a gateway between paid zones and free zones), of a particular user experience.

Resource utilization management systems of embodiments of the present invention implement an electronic user key based infrastructure to enable access to and accounting for resources, such as resources of one or more accessible resource facility. Embodiments comprise unique tags (e.g., quick response (QR) code tags, near-field communication (NFC) tags, radio frequency identification (RFID) tags, etc.) for each resource for which resource utilization management is provided. A user device, such as a smart phone, personal digital assistant (PDA), or tablet computer, executing a resource utilization management application may be configured to provide a resource key device which is operable to scan the unique tag of a resource for accessing and relinquishing that resource, whether on an ad hoc and/or reservation basis. The user device and/or other user terminals (e.g., internet portal based user terminal infrastructure) may be employed for reserving the resources, managing a user's account, etc., according to embodiments of the invention. Embodiments of a resource utilization management system infrastructure include a resource management backend platform, such as may comprise one or more servers (e.g., a resource management server, a payment gateway server, etc.) operable to facilitate resource utilization management operation using the aforementioned user devices, user terminals, and the like.

Operation of resource utilization management techniques of embodiments herein not only facilitate highly accurate use based payment for resource utilization, but also facilitate robust management of the resources. For example, dynamic relinquishment of a resource by one user and use of the relinquished time for the resource by another user is facilitated. Moreover, an operator of the resources is able to monitor the users' actual use of particular resources, to thereby determine resources which should be increased to satisfy demand, resources to be decreased due to insufficient demand, resources which are popular with users and thus account for client satisfaction, etc. Additionally, transparency with respect to the costs incurred by users for their use of resources is provided, thus facilitating an understanding by users of total costs incurred, a view into the incremental cost associated with use of particular resources, a value based resource utilization analysis, and the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
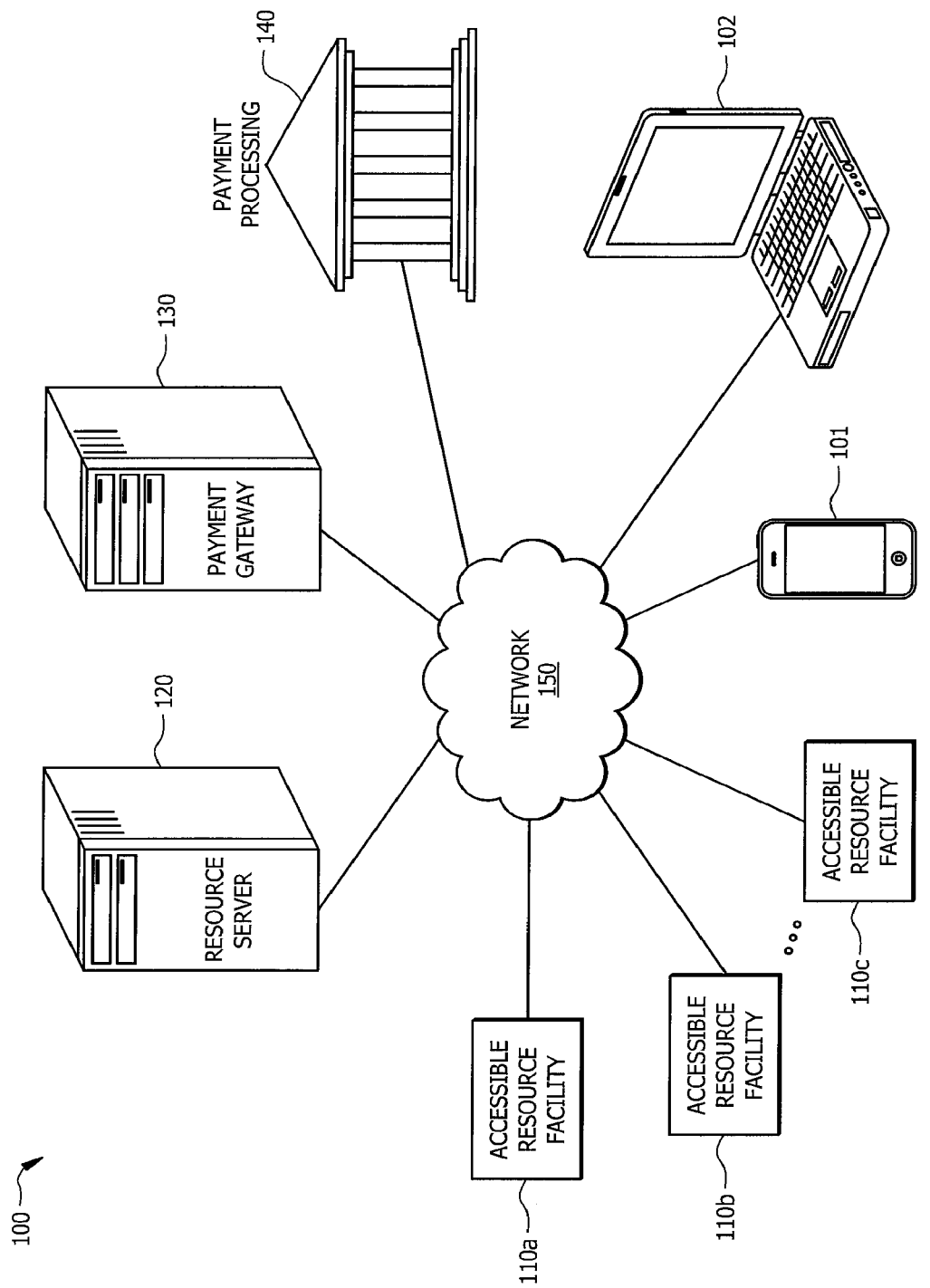
FIG. 1 shows an embodiment of a resource utilization management system according to embodiments of the present invention.

FIG. 1 shows an embodiment of a resource utilization management system according to embodiments of the present invention. Resource utilization management system 100 of FIG. 1 includes a plurality of accessible resource facilities, shown as accessible resource facilities 110a-110c, having resources available for use by users, the utilization of which are managed according to the concepts herein. Users may interact with resource utilization management system via various means, such as resource key device 101 and/or user terminal 102. The users may comprise casual users of the resources (e.g., users for which no preexisting contractual or other commitment exists with respect to the user's access to the resources made available by the resource utilization management system) or member users of the resources (e.g., users for which some form of preexisting agreement for the user's access to the resources exists providing a contractual or commitment with respect to access and/or payment for resource utilization, such as may include a monthly or annual membership fee). Of course, there is no limitation with respect to application of the concepts herein to member users paying membership fees, and thus utilization of resources may be wholly user fee based, if desired. Where different kinds or classes of users are supported, the fees incurred by such different users, including use based resource user fees, may be different for the different kinds and classes of users. Moreover, fees accounted for by resource utilization management systems of the present invention may be different on an individual user by individual user basis, if desired.

The aforementioned user devices may comprise processor-based systems operable under control of instruction sets (e.g., software, firmware, applets, etc.) adapted to provide operation as described herein. For example, resource key device 101 may comprise a smart phone, a personal digital assistant (PDA), a tablet device, a smart watch, and/or the like, while user terminal 102 may comprise a notebook computer, a personal computer, a browser based terminal, etc., all of which having a processor, memory, and input/output functionality operating under control of an appropriate client application to provide the desired functionality of concepts of the present invention. Resource key device 101 of embodiments is preferably highly portable to facilitate user interaction with resources as described herein, while user terminal 102 may be less portable (or non-portable) according to some embodiments.

Embodiments of resource utilization management system 100 herein are adapted to operate across multiple user device platforms and manufacturers. For example, through the use of resource key device applications and the attendant functionality of resource utilization management system, users' smartphones may be adapted to be a key to access and reserve limited resources, as well as the ability to pay for time of use of these resources. Such smartphones may include various sensors (e.g., cameras, microphones, location, position, and/or orientation detection, etc.) which may be utilized according to embodiments. For example, most smartphones today have optical cameras (e.g., which may be in wider circulation than NFC enabled devices) which may be readily leveraged to sense/read resource tags and thereby facilitate various aspects of resource utilization management as described herein. The use of information as may be gathered using such sensing of tags in combination with data on user and resource ID and classification, time of use, price, period of use, and/or the other metrics enable a platform of embodiments herein to manage resource allocation, access, reservation, and payment, as described below with respect to exemplary embodiments of the invention.

It should be appreciated, however, that embodiments herein are not limited to smartphone based resource key devices nor to the use of any particular technology thereof. For example, a smartphone platform that does not natively provide a particular feature, such as NFC communications, Bluetooth triangulation and tracking, etc., may nevertheless be provided with such technology (e.g., through the use of a dongle coupled to a data port of the device, addition of a protective "sleeve" having the appropriate circuitry therein which couples to a data port of the device, etc.) where needed or desired for operation as a resource key device herein. Likewise, as different technologies (e.g., NFC communications) become more widely adopted in particular user device platforms, embodiments of a resource utilization management system may leverage those technologies in addition to or in the alternative to other, legacy technologies.

Although embodiments of user devices are described above as comprising general purpose processor-based systems operable under control of an instruction set to define operation in accordance with embodiments of the invention, user devices utilized according to the concepts herein may comprise special purpose devices. For example, resource key devices of embodiments of the invention may comprise special purpose devices having application specific integrated circuits (ASICs) and/or programmable gate arrays (PGAs) adapted to provide operation as described herein.

Irrespective of the particular general purpose/special purpose nature of user devices herein, such resource key devices of the user devices preferably include an interactive user interface and one or more scanner or sensor sub-system. For example, resource key device 101 may comprise user output functionality (e.g., a display screen and/or audio output) to provide information regarding resources, resource availability, resource utilization, user account information, payment information, etc. Additionally, resource key device 101 may comprise user input functionality (e.g., a touch screen, audio input, digital pointer, and/or keyboard) to accept input regarding resource selection, resource access, resource utilization, user account information, payment information, etc. Additionally or alternatively, resource key device 101 of embodiments comprises one or more scanner sub-system (or sub-system that may be utilized in providing scanning according to embodiments herein), such as may comprise a camera, a laser scanner, an optical circuit, a radio frequency (RF) transceiver (e.g., NFC communication transceiver), etc., operable to interact with tags associated with resources as described below.

It should be appreciated that operation of resource utilization management systems of embodiments herein may provide functionality in addition to resource access, time of use accounting, and payment management. Accordingly, resource key devices of embodiments may be adapted to offer additional digital experiences (e.g., based on the location data the system has), such as to enable social networking in which users are enabled to make their location (e.g., resource or address they have provided) publicly known, to advertise their skills to those in need on the network (e.g., such as design contractors or accounts who can help growing businesses), etc.

The resources managed by a resource utilization management system of embodiments of the invention may comprise various space resources, including shared space resources (e.g., lounges, libraries, gathering halls, common use areas, etc.) and/or exclusive space resources (e.g., cubical, private offices, conference rooms, bathing facilities, etc.). Additionally or alternatively, the resources may comprise various use resources, including shared use resources (e.g., network printers, network scanners, network access, etc.) and/or exclusive use resources (e.g., photocopiers, overhead projectors, video conference equipment, personal computing equipment, etc.). Users may be provided access to any such resources according to embodiments, whereby such access may comprise temporary "ownership" of the exclusive space and exclusive use resources exclusive of other users while such access may comprise joint use of the shared space and shared use resource shared with other users.

Figure 2:
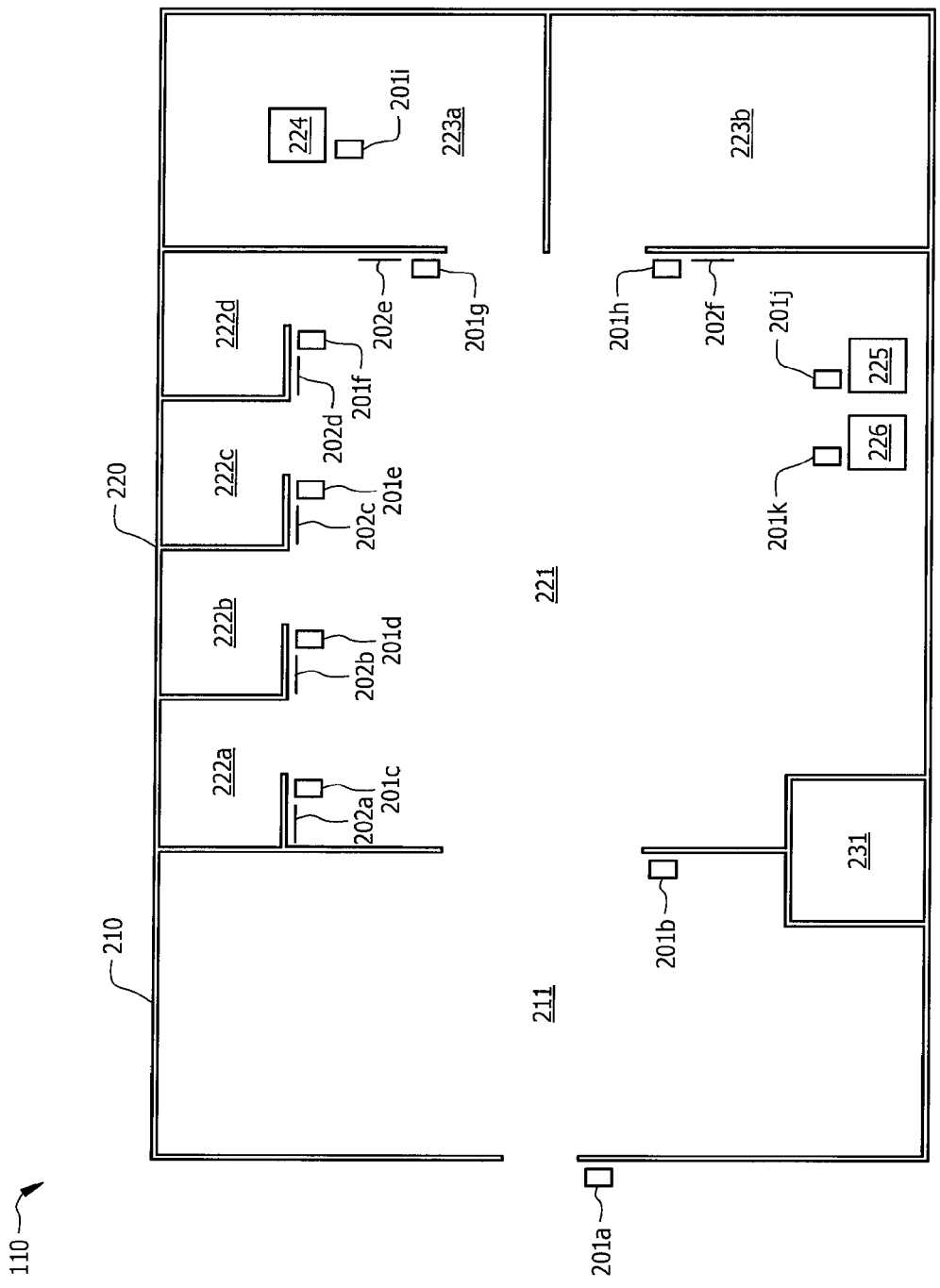
FIG. 2 shows an embodiment of an accessible resource facility of a resource utilization management system according to embodiments of the present invention.

FIG. 2 illustrates an exemplary embodiment of an accessible resource facility 110, such as may correspond to any of accessible resource facilities 110a-110c. Accessible resource facility 110 of the embodiment illustrated in FIG. 2 includes free zone 210 providing one or more resource for which no user fees are incurred, although utilization of such free zone resources may be monitored and/or managed according to the concepts herein. Additionally, accessible resource facility 110 of the illustrated embodiment includes paid zone 220 providing one or more resources for which user fees are incurred, whereby utilization of such paid zone are monitored and/or managed according to the concepts herein.

Free zone 210 illustrated in FIG. 2 includes lounge 211 comprising a shared space resource. For example, lounge 211 may comprise various seating (e.g., sofas, club chairs, etc.) and/or working (e.g., tables, counters, etc.) areas available for shared use by a plurality of users. Free zone 210 may additionally or alternatively comprise a shared use resource, such as shared network access provided by WiFi service. Although not shown in the illustrated embodiment of free zone 210, one or more exclusive space and/or use resource may be provided in a free zone according to embodiments of the invention.

Paid zone 220 illustrated in FIG. 2 includes library 221, comprising a shared space resource, and cubes 222a-222d and rooms 223a-223b, comprising exclusive space resources. For example, library 221 may comprise various seating (e.g., sofas, club chairs, recliners, etc.) and/or working (e.g., desks, carrels, etc.) areas available for shared use by a plurality of users. Library 221 may comprise amenities available for the users thereof, such as a collection of books (e.g., reference books, novels, etc.), shared network access, and/or the like, at no additional user fee (i.e., the user fee associated with library 221 includes access to such amenities). Cubes 222a-222d may comprise private or semi-private workspaces, such as may accommodate a small contingent of persons (e.g., 1-3 persons). For example, a cube provided according to embodiments may comprise an office type cubicle having a work surface, a telephone, computer network interface, electrical outlets, etc., and seating for several individuals. Rooms 223a-223b may comprise private meeting spaces, such as may accommodate a group of persons (e.g., 6-10 persons). For example, a room provided according to embodiments may comprise a conference room having a conference table and chairs, a podium, audio visual equipment, a telephone, teleconference equipment, etc.

Paid zone 220 of the illustrated embodiment includes shared use resources, shown as printer 225 and scanner 226, disposed in library 221. These resources are available to users of library 221 in parallel with their use of library 221 (i.e., a user fee for library 221 and a user fee for printer 225 and/or scanner 226 may be incurred/charged in parallel for the use thereof), according to embodiments.

Paid zone 220 of the illustrated embodiment includes exclusive space resources, shown as cubes 222a-222d and rooms 223a-223b, accessible via library 221. These resources are available to users of library 221 as nested resources with respect to library 221 (i.e., a user fee for any of cubes 222a-222d and rooms 223a-223b will suspend the user fee for library 221 during use of the nested resource, while incurring the user fee for utilization of the nested resource, such that the user fees are incurred/charged serially for the use thereof), according to embodiments.

It should be appreciated that the nesting of resources and/or the availability of parallel resources may be provided in any level of resource made available to users. For example, cubes 222a-222d and rooms 223a-223b, which comprise a level of nested resources available via library 221, may themselves provide nested and/or parallel resources. The illustrated embodiment, for example, shows projector 224 disposed within room 223a providing an exclusive use resource available in parallel with a user's utilization of room 223a.

Each of the resources of the illustrated embodiment of accessible resource facility 110 for which utilization management is provided by resource utilization management system 100 is provided a unique identification tag, shown as tags 201a-201k. To facilitate utilization management according to embodiments herein, as will be better understood from the description of embodiments which follows, a particular tag of tags 201a-201k is disposed on or near a corresponding one of the resources for which utilization management is provided. For example, tags 201a-201h are shown disposed near an entrance to an associated space resource (i.e., lounge 211, library 221, cubes 222a-222d, and rooms 223a-223b, respectively), thereby facilitating interaction with a respective tag when access to an associated resource is desired. Similarly, tags 201i-201k are shown disposed on a surface of resources (i.e., projector 224, printer 225, and scanner 226, respectively), thereby facilitating interaction with a respective tag when access to an associated resource is desired.

Although embodiments of tags, such as tags 201a-201k, may provide resource markers which are uniquely associated with a particular resource of a resource utilization management system, tags as used herein may additionally or alternatively provide location markers. Every resource within a particular location or sub-location may not be provided with its own unique tag, but instead a tag may be provided for a location or sub-location which may be utilized with respect to a number of resources associated with that location or sub-location according to embodiments. For example, a seating arrangement available for use in a shared space, such as library 221, may comprise a table and a plurality of chairs. Such resources may be somewhat mercurial within a space (e.g., moving within the space from time to time, increasing or decreasing in exact number, etc.) and thus it may be cumbersome or otherwise problematic to assign and manage individual tags in association with each such resource. Rather than providing a tag for each individual resource of this grouping, a single tag may be provided with respect to the table to indicate use of the table and an unidentified one of the associated chairs. As an example of the use of such location tag, a user may place an order for a consumable item (e.g., coffee or an office product), such as using a function of resource key device 101, and scans a location tag to provide information to accessible resource facility 110 as to the location of the user. This information may be utilized to confirm that the user is in fact in the facility, to provide information regarding where the consumable item is to be delivered, etc.

Tags 201a-201k may comprise various means by which unique identification of resources, and perhaps information associated therewith, may be provided according to the concepts herein. For example, any or all of tags 201a-201k may comprise quick response (QR) code tags, near-field communication (NFC) tags, radio frequency identification (RFID) tags, and/or the like, disposed on or near a corresponding resource. The tags utilized according to embodiments may provide unique identification of resources, wherein such unique identification may not be unique in the universe but sufficiently unique to facilitate reliable identification of a particular resource within resource utilization management system 100 for utilization management as described herein. The tags may, for example, comprise a character string (e.g., alpha characters, numeric characters, or a combination thereof) uniquely identifying an associated resource (e.g., resource ID). Such unique identification information may be utilized not only to uniquely identify a particular resource associated with the tag, but the unique identification information may further be used to access additional information (e.g., utilization pricing information, availability information, feature information, resource address and/or location, resource form, resource size and/or dimensions, resource function, etc.) for the resource. For example, the unique identification information may be utilized in association with a relational database to retrieve such additional information. Additionally or alternatively, the information provided by tags of embodiments herein may comprise record locator information, such as may identify a database record storing some or all of the foregoing information. Tags utilized according to embodiments of the invention may themselves store additional information, such as the aforementioned pricing information, feature information, resource location, resource dimensions, etc.

Various items in addition to the foregoing tags may be associated with resources to facilitate utilization management according to embodiments herein. For example, the embodiment of accessible resource facility 110 illustrated in FIG. 2 includes information user interfaces (UIs) 202a-202f provided in association with cubes 222a-222d and rooms 223a-223b. Information Ins 202a-202f may comprise a display device (e.g., a processor-based display, a smart screen, a tablet device, etc.) adapted to interact with one or more sub-system of resource utilization management system 100 and receive current resource information therefrom.

Information UIs 202a-202f may provide display of information regarding an associated one of the resources. For example, an information UI may provide information regarding the features of the resource (e.g., the amenities of the resource, the nested or parallel resources associated therewith, etc.), the availability of the resource (e.g., a calendar of times the resource is reserved by users, the time of next availability), and/or the current status of the resource (e.g., in use or available). An information UI may additionally provide information regarding other resources, such as to indicate a resource of a same or higher class is available when the resource associated with the information UI is unavailable. Such information regarding other resources may identify one or more other resource, direct the user to the other resource(s), etc. It should be appreciated that information UIs of embodiments of the invention may be interactive, such as to facilitate a user navigating between desired portions of any or all of the aforementioned information.

Accessible resource facility 110 illustrated in FIG. 2 includes point of sale 231 providing sale and/or distribution of various consumable items. For example, point of sale 231 may comprise a convenience store, a coffee shop, a lunch counter, an office supply store, and/or the like making various consumable items available to users of accessible resource facility 110. Point of sale 231 of the illustrated embodiment is shown bridging both free zone 210 and paid zone 220, such as to facilitate providing of consumable items to users of either or both such zones. In operation according to embodiments of the invention, such consumable items may be provided on a per item/per unit purchase basis with respect to users of free zone 210 and/or paid zone 220. However, as will be appreciated from the description of embodiments below, different provision/purchase models may be enabled with respect to particular users and/or users in different zones. For example, particular consumable items may be provided for a charge to users in free zone 210 while the same consumable items may be provided for a reduced charge or no charge (e.g., as an amenity of library 221) to users in paid zone 220.

Although a particular configuration of accessible resource facility 110 is illustrated in FIG. 2, it should be appreciated that he particular resources and/or the number of resources made available at any particular accessible resource facility may differ from those at other accessible resource facility. Accordingly, any or all of accessible resource facilities 110a-110c may comprise a different configuration than that of the exemplary embodiment shown in FIG. 2. Additionally, it should be appreciated that, although three accessible resource facilities are illustrated in the exemplary embodiment of FIG. 1, embodiments herein may comprise any number of access resource facilities. Moreover, there is no limitation with respect to the resources for which utilization management is provided be associated with an accessible resource facility. Various resources may, for example, be made available and utilized independent of an accessible resource facility and any other resources, if desired.

The resources made available through accessible resource facilities 110a-110c include shared resources (e.g., shared space resources, such as lounge 211 and library 221, and shared use resources, such as printer 225 and scanner 226) which are accessible to a number of unaffiliated users simultaneously and exclusive resources (e.g., exclusive space resources, such as cubes 222a-222d and rooms 223a-223b, and exclusive use resources, such as projector 224) which, although being available for use by any number of unaffiliated users, are only accessible to a particular user at any particular point in time. Accordingly, embodiments of resource utilization management system 100 of FIG. 1 are adapted to facilitate the management of reservations, access, accounting and/or payment for various resources available through accessible resource facilities 110a-110c.

Referring again to FIG. 1, resource utilization management system 100 includes resource server 120 and payment gateway 130 cooperatively operable with respect to resources of accessible resource facilities 110a-110c to provide for user controlled reservation, access, and accounting for utilization of the resources. Resource server 120 and payment gateway 130 may comprise processor-based systems, such as general purpose processor-based computers having memory and input/output functionality operable under control of one or more instruction sets to provide operation as described herein. For example, resource server 120 and/or payment gateway 130 may comprise one or more web server (e.g., a single web server configured as virtual machines for the resource server and the payment gateway, a resource server web server and a payment gateway web server, a server farm for either or both the resource server and payment gateway, etc.) operable to provide the functionality of embodiments described herein. Resource server 120 and/or payment gateway 130 may comprise one or more database useful in operation according to embodiments herein. For example, resource server 120 may comprise an accessible resource facility database providing information regarding the accessibility resource facilities of the resource utilization management system, a resource database providing information regarding the resources of the resource utilization management system (e.g., the resources of each accessible resource facility), a database of users of the resource utilization management facility, and/or the like. Such databases may be maintained to include dynamically updated information, such as regarding the use and availability of resources, user access to and utilization of resources, user preferences regarding resources and payment, etc. Resource server 120 and/or payment gateway 130 may, for example, comprise user account information database providing information regarding user accounts and rates, user payment information providing information regarding methods of payment and payment accounting, payment processing information providing information for processing payments, etc.

Resource server 120 and payment gateway 130 may be provided communication via network 150 with various user devices, such as resource key device 101 and/or user terminal 102, accessible resource facilities, such as accessible resource facilities 110a-110c, and/or resources, such as resources 211, 221, 222a-222d, 223a-223b, and/or 224-226, for operation as described herein. Network 150 may comprise various networks capable of data communication, such as the public switched telephone network (PSTN), the Internet, an intranet, an extranet, a local area network (LAN), a metropolitan area network (MAN), a wide area network (WAN), a cable transmission network, a cellular communication network, and/or the like, for providing communication to facilitate functionality as described herein.

Reservation functionality is provided by resource server 120 of resource utilization management system 100 according to embodiments, whereby a user may identify available resources of accessible resource facilities 110a-110c meeting a user's needs or desires, including determining particular resources (such as by resource class and/or resource attributes) and times available to the user, and for establishing ownership of the resources for a period of utilization by the user. For example, a user may utilize either or both of resource key device 101 and user terminal 102 to interface with resource server 120 and reserve resources, obtain reports regarding reserved resources, determine the availability of resources for reserving, modify or cancel resource reservations, and/or the like.

Figure 3:
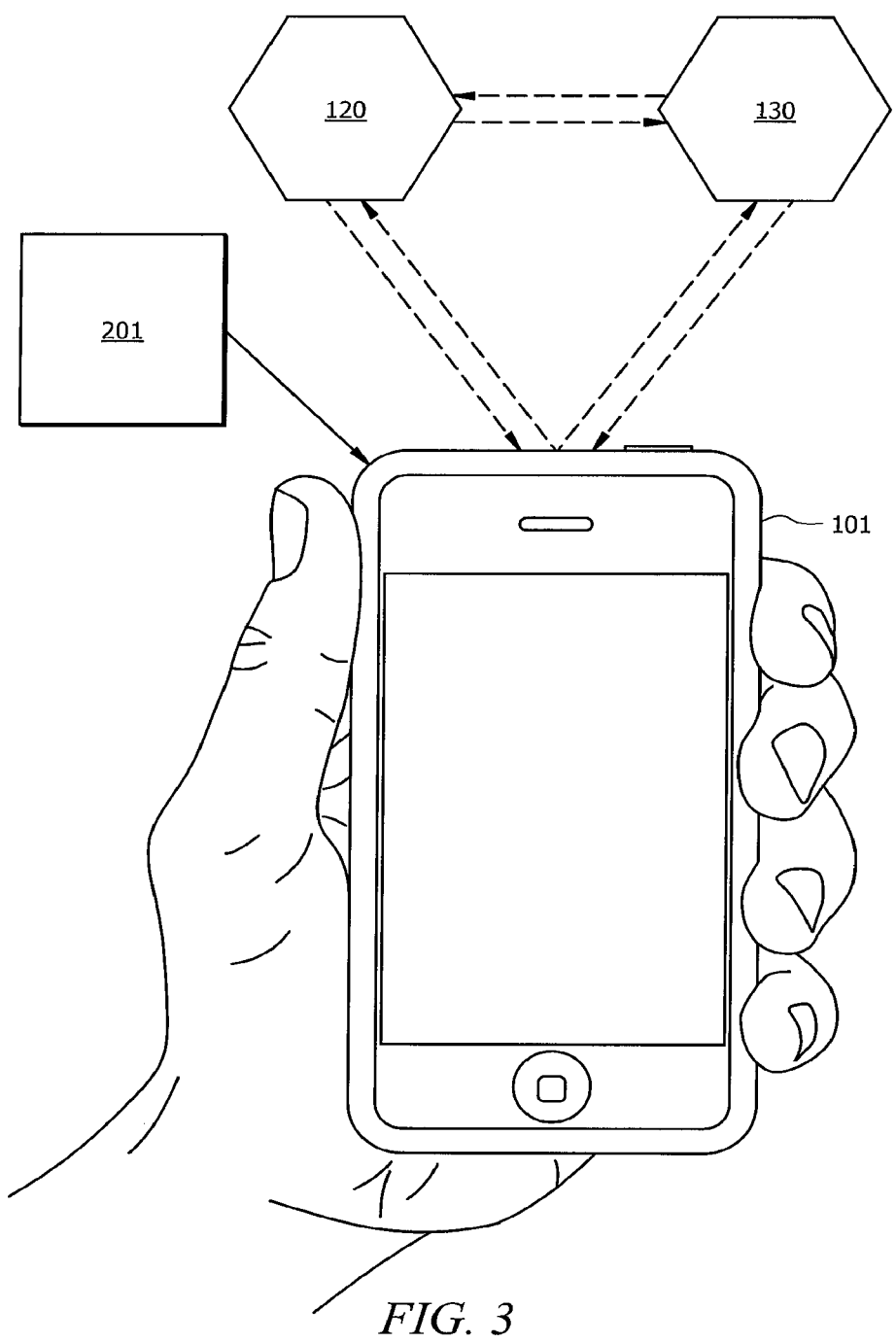
FIG. 3 shows interaction of a resource key device with other sub-systems of a resource utilization management system according to embodiments of the present invention.

Access functionality is provided by resource server 120 of resource utilization management system 100 according to embodiments, whereby a user initiates access with respect to reserved resources and/or ad hoc resource access using the aforementioned tags. For example, a user may utilize resource key device 101 of embodiments to interact with an appropriate tag of tags 201a-201k to access an associated resource of resources 211, 221, 222a-222d, 223a-223b, and 224-226. As shown in the illustration of FIG. 3, the user may operate resource key device 101 to scan a particular tag 201 and obtain the information thereof. This information may be processed by resource key device 101 and/or communicated to resource server 120 (e.g., the scanned information communicated to resource server 120, information resulting from processing of the scanned information by resource key device 101 communicated to resource server 120, or a combination thereof) to access the associated resource. Information in addition to the aforementioned scanned information and/or information resulting from processing of the scanned information may be communicated by resource key device 101 to resource server 120 according to embodiments herein. For example, resource key device 101 may provide information regarding the user's identity or user's account to resource server 120 for facilitating operation as described herein.

The foregoing access functionality may provide for simultaneous access of a plurality of resources by a particular user. For example, a user may be provided parallel resource access, wherein the user is provided access to two or more separate resources, whereby such parallel resource access may be in addition to nested resource access, wherein the user is provided access to resources within resources (e.g., parallel resources may be provided within a nested relationship with another resource). Moreover, the foregoing access functionality may provide for simultaneous access to various resources by a plurality of users.

Accounting functionality is provided by resource server 120 and payment gateway 130 of resource management system 100 according to embodiments, whereby resource server 120 provides for tracking user's actual utilization of resources and payment gateway 130 provides payment accounting and payment processing. For example, resource server 120 may provide detailed resource utilization data to payment gateway 120 for use by gateway 120 in invoice generation, billing, payment collection, and/or payment processing. As shown in the illustration of FIG. 3, a user may utilize resource key device 101 of embodiments to interact with resource server 120 to confirm resource utilization details and, thereafter, interact with payment gateway 130 to initiate payment for the resource utilization. Payment gateway 130 of embodiments operates to interface with one or more payment processing system (e.g., payment processing facility 140), such as may comprise an automated clearing house (ACH) facility, an electronic check conversion service, a credit card processing facility, and/or the like, to facilitate payment for the resource utilization. Embodiments of the invention provide for the foregoing cooperative operation of resource server 120 and payment gateway 130 to implement a single payment process upon a user exiting or otherwise relinquishing use of a last paid zone resource, such as a highest level paid zone resource (e.g., a first paid zone accessed/last paid zone relinquished, an outermost paid zone of a nested group of paid zones accessed, or a paid zone providing a gateway between paid zones and free zones), of a particular user experience (e.g., upon a user exiting paid zone 220 of accessible resource facility 110 of FIG. 2).

As will be better understood from the discussion which follows, the interaction between resource server 120 and payment gateway 130 of embodiments is not limited to the reporting of resource utilization by resource server 120 and the resulting generation of an invoice or statement by payment gateway 130. For example, the accounting functionality provided according to embodiments facilitates flexible, dynamic, and/or unique pricing for resource utilization, such as based upon the particular resource, the particular user, the particular time of use, particular location of use, rewards based incentives, etc. Accordingly, payment gateway 130 may comprise a database of user account information, including resource pricing for particular users, reward milestones for particular users, etc., such as may be reported by payment gateway 130 to resource server 120 for facilitating various functionality according to embodiments. For example, resource server 120 may provide information regarding the cost for utilization of a particular resource to a user, such as in response to a user a user initiating access with respect to a resource using the aforementioned user key device and tags in order to confirm that the user agrees to incur the particular charges.

Figure 4:
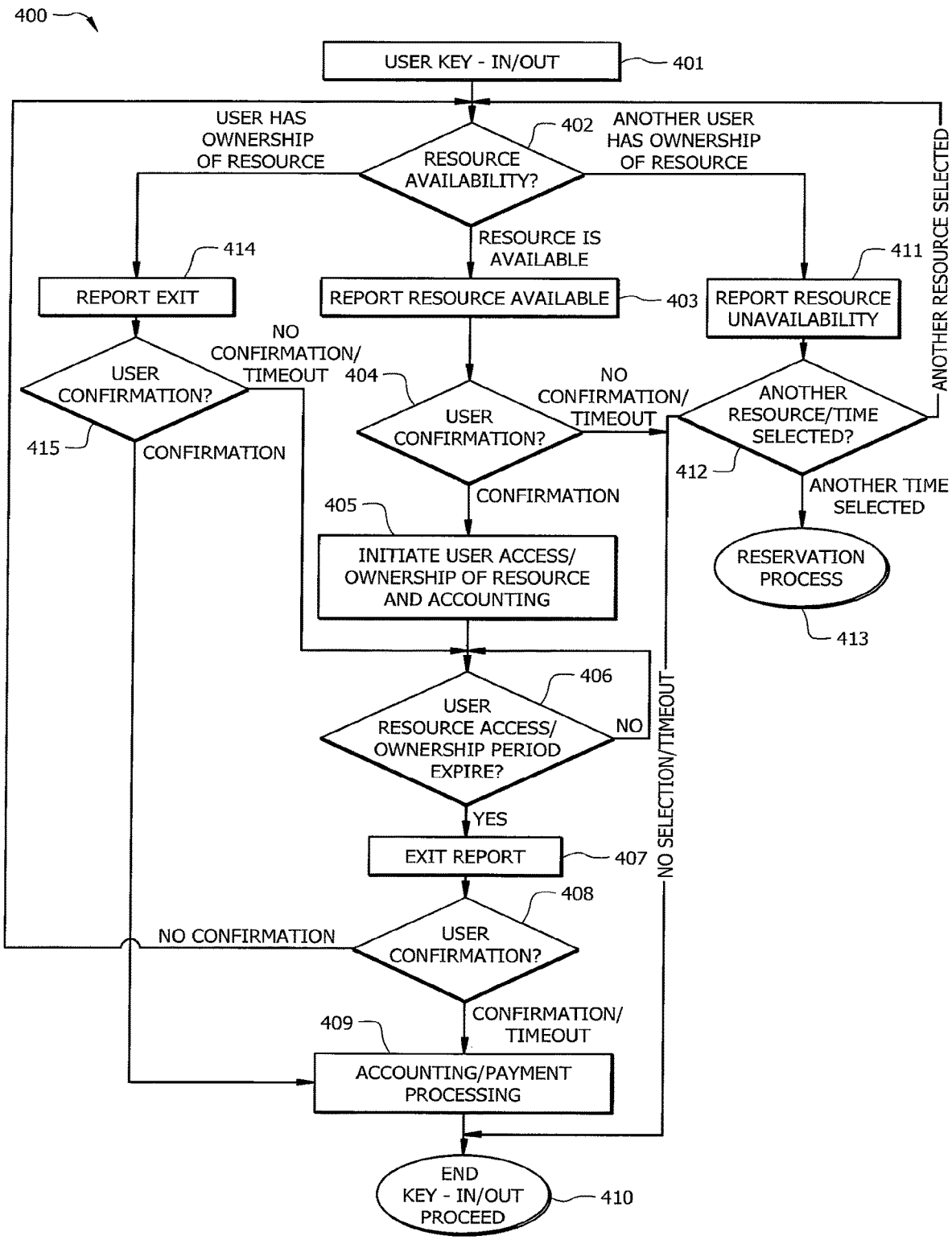
FIG. 4 shows a high level flow diagram showing user key-in/key-out operation of a resource utilization management system according to embodiments of the present invention.

Having described components of a resource utilization management system adapted according to embodiments of the invention, attention is directed to FIG. 4 wherein a high level flow diagram showing operation of such a resource utilization management system is provided in flow 400. In particular, flow 400 shows the process for a user keying in or out of a resource, such as any of resources 211, 221, 222*a*-222*d*, 223*a*-223*b*, and 224-226, using resource key device 101 according to embodiments of the present disclosure.

At block 401 of the illustrated embodiment, the user initiates a key-in or key-out interaction with a particular resource. It should be appreciated that such a subject resource for which the key-in interaction is initiated may comprise a resource for which the user has reserved, a priori, access privileges for the resource or may comprise a resource for which the user wishes to access on an ad hoc basis.

In key-in and key-out interactions according to embodiments of operation at block 401, the user may manipulate resource key device 101 (e.g., manipulate a resource key device button or touch screen, shake a resource key device having motion sensing capability, provide a voice command to an audio input of the resource key device, hold the resource key device in proximity to a resource tag, place the resource key device in contact with a resource tag (such as to tap or bump the resource tag), etc.) to indicate that the user wishes to make a request with respect to a resource, thereby causing the resource key device of embodiments to initiate a request in the form of a user report (referred to herein as a U-report). In response to the user initiating the request, the resource key device may operate to scan a tag associated with a resource which the user wishes to access. For example, if the user wishes to access lounge 211 (part of free zone 210), the user may manipulate resource key device 101 to scan tag 201*a*, disposed near an entry of lounge 211 in the embodiment illustrated in FIG. 2. Similarly, if the user wishes to access library 221 (part of paid zone 220), the user may manipulate resource key device 101 to scan tag 201*b* disposed near an entry of lounge 211 in the illustrated embodiment. If the user wishes to room 223*a* (part of paid zone 220 nested within library 221) or the access projector 224 (part of paid zone 220 available in parallel with room 223*a*) the user may manipulate resource key device 101 to scan a respective one of tags 201*g* (disposed near an entry of room 223*a* in the illustrated embodiment) or 201*i* (disposed on a surface of projector 224 in the illustrated embodiment).

Manipulation of resource key device 101 to scan a tag may comprise various actions and interactions, depending upon the particular configuration of resource key device and tags used. For example, where the resource key device comprises a smart phone and the tag comprises a QR code tag, manipulation of the resource key device may comprise launching a resource utilization management system client app, selecting a QR code tag scan function, and causing a camera of the smart phone to capture an image of the appropriate QR code tag for processing. Where the resource key device comprises a RFID reader (e.g., a smart phone, a dedicated purpose device, or other device adapted to have RFID scanning functionality), manipulation of the resource key device may comprise launching a resource utilization management system client app, selecting a RFID tag scan function, and ensuring that the resource key device is within proximity of the appropriate RFID tag for RF interrogation and processing of the interrogated information. Where the resource key device comprises a NFC reader (e.g., a smart phone, a dedicated purpose device, or other device adapted to have NFC scanning functionality), manipulation of the resource key device may comprise launching a resource utilization management system client app, selecting a NFC tag scan function, and touching the resource key device to, or perhaps placing the resource key device nearby, the appropriate NFC tag for near-field interrogation and processing of the interrogated information.

Irrespective of the particular technique used for scanning the tag, operation at block 401 of flow 400 according to embodiments processes the information obtained from the scanned tag to generate a resource query report (referred to herein as a Q-report) for further key-in/key-out processing with respect to the associated resource. A Q-report preferably contains information uniquely identifying the associated resource or from which the resource may be uniquely identified. Additionally, the Q-report may include additional information, such as information regarding the class of the particular resource (e.g., lounge, library, cube, room, printer, scanner, projector, etc.), the location of the resource (e.g., physical address, the particular accessible resource facility, the floor within the accessible resource facility, the zone in which the resource is disposed, etc.), and/or information associated with the uniqueness of the key-in/key-out event. It should be appreciated that some or all of the foregoing information may be encoded in the tag (e.g., obtained by the resource key device by scanning the tag) or may be accessible external to the tag (e.g., stored in a database of the resource key device or the resource server and accessed using information obtained by scanning the tag). Accordingly, generation of the Q-report of embodiments herein may comprise utilizing information obtained from the scanned tag to access additional information, perhaps through communication with resource server 120, used in the Q-report. Alternatively, however, the Q-report of embodiments may comprise a unique resource identifier which, when utilized by the resource server, provides any necessary information for the particular resource.

Operation for key-in or key-out at block 401 of flow 400 of embodiments further includes generation of a device report (referred to herein as a D-report). For example, Q-report generation as described above prompts operation by resource key device 101 to generate a D-report utilized with respect to accessing resources herein. A D-report preferably contains information identifying a user account associated with the resource key device initiating the key-in/key-out process (e.g., identifying the particular resource utilization management system user or client that is engaging in the key process). The D-report may include additional information, such as a timestamp at which this event has occurred and/or other information from or associated with the particular key event. For example, information obtained from one or more sensor (e.g., camera, microphone, thermometer, positioning sensor, etc.) may be collected and included in the D-report for use by a resource server herein. A camera, or other light sensor, may capture the ambient light level, for use in making adjustments to lighting within space of the resource for which the user wishes to utilize, for instance. Additionally or alternatively, information regarding various preferences (e.g., room temperature, lighting level, audio and/or video programming selections, etc.) of the user regarding their preferred experience with the resource, the class of resource in which the resource is included, or the resources which the user may access may be included in a D-report according to embodiments of the invention. Such information may, for example, be utilized by a resource server in configuring a resource for the user, in addition to granting access/ownership of the resource to the user and providing accounting functionality as described herein.

In operation of the user key-in/key-out process at block 401 of embodiments, the information above, or some portion thereof, is utilized in making a request to resource server 120. For example, the foregoing U-report, Q-report, and D-report, or some portion(s) thereof, may be used to compile an aggregated access request report (referred to herein as a UQD-report) which is provided to resource server 120 with respect to the user accessing the resource by resource key device 101, such as via network 150. Such an access request may thus provide identification of the resource that the user is making a request with respect to and may include additional information useful for the user's access experience (e.g., the above described information regarding location and class of the resource, the user's preferences, etc.).

At block 402 of flow 400 a determination is made as to whether a resource identified in an access request (e.g., the aforementioned UQD-report) is available. In operation according to embodiments, resource server 120 may utilize information from the access request to identify the resource that the user is accessing (e.g., using resource identification information from the access request, using information in the access request to obtain resource identification information from a database available to the resource server, etc.) and to determine the state of the resource (e.g., using resource identification information to access a resource database storing utilization state information). As will be more fully described below, a resource may be available to the user, already in use by the user, or the resource may be unavailable to the user (e.g., a shared resource is in use by a capacity number of users already or an exclusive resource is in use by another user).

Accordingly, resource server 120 may operate to determine if the subject resource is currently in an "available" state or an "unavailable" state. Where the resource is indicated as being in an available state (e.g., using a resource information database available to resource server 120), the resource may be determined to be available to the user. In contrast, where the resource is indicated as being in an unavailable state (e.g., using the resource information database), the resource may be determined to be unavailable to the user. However, where the resource is indicated as being in a reserved state (e.g., using the resource information database), further processing may be performed to determine if the user is the one for whom the reservation is made. If the resource reservation is for the user, the resource may be determined to be available to the user. However, if the resource reservation is for another user, the resource may be determined to be unavailable to the user.

In operation according to embodiments, a report regarding the availability state of the resource is provided in response to the access request at block 402. For example, resource server 120 may provide an affirmative report (referred to herein as a Y-report) or a negative report (referred to herein as a N-report) regarding the availability state of the resource to resource key device 101 for further processing according to flow 400 of the illustrated embodiment. As will be better understood from the discussion which follows, such Y-reports and N-reports may include various information (e.g., resource information, user preference information, pricing information, access time information, information regarding other resources, such as alternative resources, nested resources, parallel resources, etc.) to facilitate operation as described herein. It should be appreciated that the aforementioned information may include globally applicable information (e.g., availability and/or pricing information applicable to all users of the resource utilization management system), information applicable to a subset of users (e.g., availability and/or pricing information applicable to a member/non-member user, applicable to a particular level of user, etc.), information applicable to particular users (e.g., availability and/or pricing information applicable to an individual user), and the like.

Assuming that it is determined that the resource is available at block 402, processing according to the illustrated embodiment proceeds to block 403 wherein an affirmative report is provided. For example, resource server 120 may provide a Y-report to resource key device 101, such as via network 150, to indicate that the subject resource is available to the user.

Having been provided an affirmative report with respect to the resource, processing according to the illustrated embodiment proceeds to block 404 for user confirmation of the desire to access the subject resource. For example, resource key device 101, upon receiving a Y-report in response to an UQD-report, may display a query to the user to ask the user to confirm that the user wishes to access the resource, requiring a response from the user (e.g., manipulation of a resource key device button or touch screen, shaking of a resource key device having motion sensing capability, a voice response to an audio input of the resource key device, etc.) to assent to the resource access. It should be appreciated that such a user confirmation may be utilized to provide a "two-tap" configuration according to embodiments in which the user performs a first "tap" when affirmatively manipulating the resource key device to initiate the key-in/key-out process (e.g., scan a particular resource tag) and then a second "tap" when affirmatively manipulating the resource key device to confirm the desire to utilize the resource. Such a two-tap configuration may be desirable for use with respect to pay per use resources to avoid disputes or confusion with respect to charges incurred by a user, to avoid undesired or unintended grants of access (e.g., associated with accidental interaction of a resource key device with a resource tag), etc.

The aforementioned user confirmation, in addition to providing the aforementioned "two-tap" confirmation, may be utilized to present information to the user regarding the resource and receive acknowledgment of the information by the user. For example, the affirmative report may include various information regarding the subject resource, such as pricing information for the use of the resource as applicable to the user (e.g., global pricing information where such pricing is applicable to the user, group pricing information where the user is a member of a particular group of users, or individual pricing information when such pricing is applicable to the user), information regarding a default time the user will be granted access, information regarding a period of time the resource is available for the user, information regarding amenities of the resource, nested or parallel resources available with respect to the user's utilization of the resource, rewards/loyalty points awarded for use of the resource, rewards/loyalty points available for redemption toward use of the resource, and/or the like, which may be presented to the user by the resource key device in a user confirmation process according to embodiments. For example, a price per hour/price per unit and/or total cost of utilization of the resource may be presented to the user in association with a query for the user's confirmation that the resource is to be accessed by the user, thereby providing affirmative confirmation with respect to the charges to be incurred by the user. Similarly, a default time (e.g., 15 minutes) for the user's access to the resource may be presented to the user for confirmation and/or user selection of a different time (e.g., increase/decrease the default time, perhaps in predetermined increments of time).

Although the foregoing description of resource availability and confirmation has been with reference to a resource that is the subject of a user's key-in/key-out interaction, it should be appreciated that operation may additionally provide such functionality with respect to additional resources. For example, the subject resource (e.g., room 223*a* of FIG. 2) may include a nested resource (e.g., projector 224) and/or have one or more resources commonly used in parallel with the subject resource (e.g., printer 225 and scanner 226). Resource server 120 of embodiments may identify such additional resources (e.g., through interaction with a resource information database, analysis of past users' utilization of the resources, analysis of the requesting user's utilization of resources, analysis of the user's preference information, etc.) and include information (e.g., availability, pricing, etc.) regarding one or more such additional resource in the Y-report. Operation by resource key device 101 of embodiments may thus present information regarding these additional resource(s) to the user for confirmation at block 404 to allow the user to not only confirm that the subject resource is to be accessed, but to also access one or more additional resource. The user may select/confirm or not select/not confirm any such resource for access by the user. Alternatively, the use may provide preference information indicating that the user would like/not like access to additional resources (e.g., particular additional resources, additional resources typically available with respect to particular subject resources, particular classes of resources, etc.) to thereby automatically select one or more additional resource or avoid being provided with the opportunity to select one or more resource, as desired. It should be appreciated, however, that more than one resource, and in particular more than a particular resource initially identified by the user in a user key-in/key-out operation may be provided access through a same key-in/key-out operation of embodiments herein.

As previously discussed, operation at block 404 of the illustrated embodiment provides for user confirmation of the desire to access the subject resource. In operation according to the illustrated embodiment, should the user respond to the confirmation in the negative (i.e., indicate that access to the subject resource is not desired) or fail to respond to the confirmation in the affirmative (i.e., indicate that access to the subject resource is desired) within some predetermined period of time (e.g., confirmation time-out threshold) the user will not be provided access to the resource and processing proceeds to block 410 where the key-in/key-out process of the illustrated embodiment terminates. Such operation provides for avoiding accidental or unwanted grants of access to resources, thereby preventing disputed charges incurred by the user, unnecessary unavailability of resources to other users, etc. Accordingly, embodiments preferably implement the aforementioned user confirmation processing, or some other form of access confirmation. It should be appreciated, however, that the aforementioned user confirmation process may be omitted according to embodiments, if desired.

Should the user respond to the confirmation at block 404 in the affirmative (i.e., indicate that access to the subject resource is desired), processing according to the illustrated embodiment proceeds to block 405 wherein user access to the subject resource is initiated. For example, resource key device 101 may provide a Y-report to resource server 120 indicating the user's confirmation of the subject resource (and perhaps additional resource(s)) access. The user may thus utilize the resource. For example, where the resource is a space resource (e.g., lounge 211, library 221, cubes 222*a*-222*d*, or rooms 223*a*-223*b*), the user may enter and enjoy the space, and amenities thereof, initiate access with respect to nested and/or parallel resources associated therewith, etc. Where the resource is a use resource (e.g., projector 224, printer 225, or scanner 226), the user may begin utilizing of the resource.

In operation according to embodiments, upon initiation of user access to/ownership of the subject resource, resource server 120 records the user's access, such as for various purposes including accounting, loyalty point award, resource utilization tracking, establishing and monitoring user resource access/ownership time periods, and/or the like. For example, where the subject resource is an exclusive resource, the resource may be designated as "in-use" by resource server 120, thereby providing "ownership" of the resource to the user and making the resource unavailable to other users. Where the subject resource is a shared resource, a utilization count may be incremented for use in determining when the utilization of the shared resource has reached capacity (e.g., where capacity may be an issue with respect to additional users being granted access to the resource). Resource server 120 may additionally or alternatively initiate a timer or other utilization tracking functionality, such as may be useful in determining charges for the resource utilization by the user, for initiating continued utilization confirmation messaging to the user, for resource utilization management, tracking, and/or planning purposes, etc. It should be appreciated that even where the subject resource is part of free zone 210 of the embodiment illustrated in FIG. 2, such utilization count and timer information may be desirable, such as to manage the resources made available at an accessible resource facility, to ensure a capacity limit (e.g., fire code occupancy limit) is not exceeded, to award loyalty points, to provide periodic messaging to confirm that a user has not relinquished access without initiating a key-out process, and/or the like.

Initiation of user access to/ownership of the subject resource may comprise various control and/or messaging operations. For example, resource server 120 may provide a message to resource key device 101 indicating that the access has been granted, providing a timer or piece counter for indicating access remaining to the user, providing a running charge tally for indicating the charges incurred by the user in real-time, etc. Such control or messaging may be provided to devices and/or subsystems in addition to or in the alternative to the aforementioned resource key device. For example, resource server 120 may provide control signals to the subject resource itself, or some subsystem thereof, to facilitate access and/or use by the user. As one example, resource server 120 may cause a bolt to release to physically grant access to a space resource. Additionally or alternatively, resource server 120 may control a state (e.g., power-on or active state) of lighting and/or amenities (e.g., audio system, television, telephone system, climate control system, etc.) within a space resource to enable utilization by the user and/or to set operation thereof at user preference levels. Similarly, resource server 120 may control a state (e.g., power-on or active state) of a use resource to facilitate its utilization by the user. As another example, resource server 120 may provide control and/or messaging signals to one or more information UI (e.g., an information UI of information UIs 202*a*-202*f* associated with the subject resource) to control display of the "in-use" status of the resource, the time the resource is to again become available for use, a time or piece utilization counter, etc. It should be appreciated that the control of such an information UI to display the in-use status of an associated resource, according to embodiments, facilitates an "honor" system for use of resources (e.g., avoiding the use of bolts, power disruption, etc. to prevent unauthorized use of a resource by clearly displaying the in-use/available state of a resource thereby discouraging trespassing), self-service, ad hoc access to resources by the users, and general transparency with respect to the use and enjoyment of resources of the resource utilization management system.

After processing to initiate user access to/ownership of the subject resource, operation according to the illustrated embodiment proceeds to block 406 wherein an access period is monitored. For example, resource server 120 may operate an access timer/piece counter throughout the user's utilization of the resource for accounting, tracking, and/or management purposes. Where the user is provided some predetermined access period or piece count, processing according to embodiments may operate to monitor the appropriate timer/counter to determine if the access period is expired. Even where the user is not provided some predetermined access period or piece count, monitoring a timer/counter to initiate periodic queries to the user to confirm their continued desire to utilize the resource and that they have not relinquished access to the resource without a key-out process may be desired. If the access period has not expired, processing at block 406 may loop to continue monitoring for expiration of the access period. However, if the access period has expired, processing according to the illustrated embodiment proceeds to block 407.

At block 407 of flow 400 of FIG. 4, resource relinquishment processing is initiated. For example, resource server 120 may generate an exit report (referred to herein as an E-report) for facilitating graceful termination of the user's access to the subject resource. An E-report may, for example, include information regarding the expiration of a time period or piece count of the user's access, the charges incurred, the further availability of the resource for access by the user, other resources available to the user, etc. Such an E-report may be provided by resource server 120 to resource key device 101 for resource relinquishment confirmation and/or other exit processing operation.

Having been provided exit processing information, such as the aforementioned E-report, processing according to the illustrated embodiment proceeds to block 408 for user confirmation of the desire to relinquish access to the subject resource. For example, resource key device 101 may, upon receiving an E-report, display a message to the user regarding a time or piece count threshold having been met and to query to the user to ask the user to confirm that the user wishes to relinquish access to the resource. In operation according to embodiments, a response is solicited from the user (e.g., manipulation of a resource key device button or touch screen, shaking of a resource key device having motion sensing capability, a voice response to an audio input of the resource key device, etc.) to avoid accidently or unintentionally relinquishing the resource access. If, for example, the user either fails to respond to the query or responds to the query in the affirmative (i.e., indicating assent to relinquishment of the resource access), processing according to the illustrated embodiment proceeds to block 409 for resource access exit processing.

The resource access exit processing provided at block 409 of embodiments may include accounting and/or payment processing. For example, resource server 120 may operate to stop a timer/piece counter and determine a total charge incurred by the user's utilization of the resource being relinquished. This information may be provided to the resource key device for display to the user and/or for use in other processing according to embodiments herein. For example, resource server 120 may generate an accounting report (referred to herein as an A-report) comprising information such as that described above and provide that report to resource key device 101, such as via network 150. Preferred embodiments operate to provide for invoicing and payment for resource utilization at the conclusion of a user's experience or paid resource experience (e.g., upon the user exiting the accessible resource facility or upon the user exiting the paid zone of the accessible resource facility). Accordingly, where the user is relinquishing access to a nested resource or a parallel resource and continuing to access another resource (e.g., a higher level resource, such as a paid resource through which access was gained to the resource for which access is being relinquished or an outer paid resource of a nested group of paid resources in which the resource for which access is being relinquished is part of, or another resource used in parallel with the resource for which access is being relinquished), processing at block 409 for exiting this particular resource may not result in payment processing (e.g., the user may be advised of the costs incurred, without yet being presented with an invoice or a solicitation for payment). The user, nevertheless, accrues the charges for the resource exited (assuming the resource was a paid resource) and may continue to accrue charges for one or more resources (e.g., a higher level resource into which the user exits, one or more parallel resources still being accessed by the user, etc.), according to embodiments of the invention. It should be appreciated that resource server 120 of embodiments may continue to operate one or more timer and/or piece counter (e.g., as appropriate to resources for which the user continues to access), perhaps at rates different than those associated with the utilization of the resource exited, after resource access exit processing of block 409 where the user continues to access resources of the accessible resource facility.

It should be appreciated from the foregoing that operation of a resource utilization management system of embodiments may provide tracking with respect to the utilization of individual resources by the user (e.g., for accounting purposes, resource availability purposes, reward/loyalty purposes, etc.), tracking of the user throughout an accessible resource facility (e.g., for facility management purposes, for user experience monitoring purposes, etc.), and accounting and payment processing (e.g., for applying appropriate usage fees on a user by user and resource by resource basis, for automated invoicing and payment collection, etc.). Such operation facilitates the management of resources to ensure an appropriate number of resources are made available (e.g., to attempt to always have particular resources available for ad hoc access by users while maintaining a level of resource utilization to keep the business viable), to enable an enhanced user experience (e.g., allowing ad hoc access, reserved access, unassisted and unilateral interaction with resources by users, etc.), and/or to make a plurality of resources readily available for use by users (e.g., subscribing or member users, casual or walk-up users, etc.).

Operation at block 409 may include processing in addition to the aforementioned accounting and/or payment processing. For example, resource server 120 may update the status of the exited resource to "available" in a resource database. Additionally or alternatively, resource server 120 may provide control and/or message signaling, such as to update one or more information UI (e.g., an information UI of information UIs 202a-202f associated with the subject resource) to control display of the "available" status of the resource, to provide a message to a resource key device of another user that the resource has become available, etc. In operation according to embodiments, such signaling may operate to control a state (e.g., power-off or standby state) of lighting and/or amenities (e.g., audio system, television, telephone system, climate control system, etc.) within a space resource and/or control a state (e.g., power-off or standby state) of a use resource to set operation thereof at default or standby levels.

Upon completion of the resource access exit processing provided at block 409, operation the process for a user keying in or out of a resource of flow 400 of the illustrated embodiment terminates at block 410. It should be appreciated that, although this particular process has terminated with respect to a particular user's key-in/key-out process, the process may continue to be implemented with respect to this user (e.g., for a higher level resource of a nested set of resources) and/or other users of the resource utilization management system.

Referring again to the determination made at block 408, if, rather than responding to the query in the affirmative or failing to respond to the query at all, the user instead responds to the query in the negative (i.e., indicating a desire not to relinquish the resource access), processing according to the illustrated embodiment returns to block 402 wherein a determination is made as to whether the subject resource is available for the user's further use. Further processing as described herein with respect to the resource availability determination and providing user access or reporting resource unavailability may thus be provided.

Having described processing according to flow 400 for the situation where a subject resource is determined to be available in response to a user key-in operation according to the embodiment illustrated in FIG. 4, reference is again made to the determination made at block 402. If, rather than it being determined that the resource is available at block 402, it is determined that the resource is unavailable to the requesting user (e.g., due the resource being "owned" by another user whether by reservation or access, the resource being at capacity through use by other users, etc.), processing according to the illustrated embodiment proceeds to block 411 for resource unavailability processing.

At block 411 of embodiments, a negative report is provided. For example, resource server 120 may provide a N-report to resource key device 101, such as via network 150, to indicate that the subject resource is unavailable to the user. Such a N-report may include various information (e.g., resource information, resource access availability information, pricing information, information regarding other resources, such as alternative resources, nested resources, parallel resources, etc.) to facilitate operation as described herein.

Having been provided a negative report with respect to the subject resource, processing according to the illustrated embodiment proceeds to block 412 for user selection of a different, available resource and/or a different, available time. For example, resource key device 101, upon receiving a N-report in response to an UQD-report, may display information regarding availability of one or more other resource, one or more time the subject resource or another resource is available, etc. For example, where the subject resource is currently not available, but is scheduled to become available in the near future (e.g., 15-45 minutes), such information may be provided in the N-report and resource key device 101 may display a message to inform the user accordingly. Additionally or alternatively, information regarding alternative resources (e.g., resources of a same class, a similar class, having the same or similar features, nearby in proximity, etc.) which are available, or which are scheduled to become available in the near future, may likewise be provided in the N-report and correspondingly a message displayed to the user regarding their availability. The information regarding such alternative resources (the alternative resources including an alternative available time for the subject resource) provided to the user may include information in addition to identification of the particular alternative resources available.

Operation at block 411 according to embodiments, having been presented with alternative resource availability information, as described above, may proceed to query the user regarding whether the user wishes to access one or more of the alternative resources. For example, the user may be enabled to select a particular alternative resource/time (e.g., through manipulation of a resource key device button or touch screen, a voice response to an audio input of the resource key device, etc.) to select a desired alternative resources. Where the user elects to access an alternate resource, processing according to the illustrated embodiment proceeds to return to block 402 wherein this resource is availability is confirmed and remains available for the user. Further processing as described herein with respect to the resource availability determination and providing user access or reporting resource unavailability may thus be provided. Where the user elects to access an alternate time, processing according to the illustrated embodiment proceeds to initiate a resource reservation process, as represented by block 413 (an example of which is described below with respect to flow 500 of FIG. 5), in order to establish "ownership" of the appropriate resource at an alternate time. However, where the user does not elect to access an alternate resource/time, processing according to the illustrated embodiment proceeds to block 410 where the key-in/key-out process of the illustrated embodiment terminates.

Having described processing according to flow 400 for the situations where a subject resource is determined to be available or unavailable in response to a user key-in operation according to the embodiment illustrated in FIG. 4, reference is again made to the determination made at block 402. If it is determined that the user already has "ownership" of the subject resource (e.g., the user has already been granted access to the resource), operation according to the illustrated embodiment operates under the presumption that the user may wish to relinquish access to that resource and thus proceeds to block 414. That is, in operation according to embodiments, a same tag may be used with respect to a resource for both a key-in and key-out process to thereby provide a simple, intuitive user interface. Accordingly, where it is determined at block 402 that the user already has access to the subject resource, processing is provided according to embodiments to determine if the user wishes to relinquish access to that resource.

At block 414 of flow 400 of FIG. 4, resource relinquishment processing is initiated. For example, resource server 120 may generate an E-report for facilitating termination of the user's access to the subject resource. An E-report may, for example, include information regarding the expiration of a time period or piece count of the user's access, the charges incurred, the further availability of the resource for access by the user, other resources available to the user, etc. Such an E-report may be provided by resource server 120 to resource key device 101 for resource relinquishment confirmation and/or other exit processing operation.

Having been provided exit processing information, such as the aforementioned E-report, processing according to the illustrated embodiment proceeds to block 415 for user confirmation of the desire to relinquish access to the subject resource. For example, resource key device 101 may, upon receiving an E-report, display a message to the user regarding the user already having access to the subject resource and to query to the user to ask the user to confirm that the user wishes to relinquish access to the resource. In operation according to embodiments, a response is solicited from the user (e.g., manipulation of a resource key device button or touch screen, shaking of a resource key device having motion sensing capability, a voice response to an audio input of the resource key device, etc.) to avoid accidently or unintentionally relinquishing the resource access. If, for example, the user either fails to respond to the query or responds to the query in the negative (i.e., indicating the user does not wish to relinquish access to the resource), processing according to the illustrated embodiment returns to block 406 wherein the user continues to have access to the subject resource and an access period is continued to be monitored. However, if the user responds to the query in the affirmative (i.e., indicating assent to relinquishment of the resource access), processing according to the illustrated embodiment proceeds to block 409 for resource access exit processing, as described above.

It should be appreciated from the foregoing that exiting a resource may relinquish access to that resource and stop accrual of charges (where the resource is a paid resource) associated with the use thereof. Such exiting a resource may not, however, stop accrual of all charges for the user. For example, the user may exit a nested resource and thus the user status may automatically revert into the next higher level nested resource (e.g., a resource that is outside of the resource that is being exited). A specific example of this may be that the user exits cube 222a and thus is automatically switched back to library 221. As library 221 is also part of paid zone 220, thus having a paid aspect thereof, the user may continue to accrue charges (although perhaps at a different price/rate etc.) for utilization of resources after having relinquished access to cube 222a. Stated another way, the key-out process with respect to one resource (e.g., cube 222a) may simultaneously provide a key-in process with respect to another resource (e.g., library 221). It should be appreciated, however, that such simultaneous key-out/key-in processing need not be implemented according to embodiments, such as where resources are utilized in parallel rather than nested. In a parallel resource utilization scenario, the user may key-in/key-out of the parallel resources independently, for example.

It should also be appreciated that a user need not continue to accrue charges after having relinquished access to a resource. For example, where the user relinquishes access to all resources of a paid zone (e.g., exits library 221 of paid zone 220), the accrual of charges with respect to that user may cease. The user may, nevertheless, simultaneously key-in to another resource. For example, the key-out process with respect to library 221, and thus paid zone 220, may simultaneously provide a key-in process for lounge 211, and thus free zone 210. Although charges may not accrue to a user with respect to their use of resources of a free zone, embodiments of the invention may nevertheless provide management and/or tracking with respect to a user's access to such resources (e.g., to collect data regarding the utilization of resources, to provide access management for capacity limitations, to provide particular amenities for certain users/classes of users, to award loyalty points, etc.). Embodiments may, however, not implement key-in and/or key-out processes with respect to certain resources, such as the aforementioned free zone resources, such as where resource tracking, data collection for the utilization of these resources, etc. is not desired.

Embodiments may provide resource access exit processing, such as through operation at block 409 of embodiments, which facilitates a key-out of all resources (or perhaps all paid zone resources) in a same operation. For example, a "checkout of all resources" option may be provided to a user for initiating key-out processing as described herein with respect to all resources (or all paid zone resources) currently being accessed by a user. Such a feature may be utilized to ensure that a user does not incur charges, or that resources are not otherwise shown as being utilized by the user, when the user does not intend to utilize the resources further. Where the user has accessed a number of resources, perhaps including a number of nested resources and/or parallel resources, such an option to checkout of all resources may be desirable to provide comfort to the user that the resource utilization management system is properly updated to reflect the user's relinquishment of all resources.

Resource access exit processing provided at block 409 of embodiments may include payment processing, such as to invoice and/or collect for the utilization of the resource being exited and possibly other resources utilized by the user during their experience. For example, embodiments herein may operate to provide for invoicing and payment for resource utilization at the conclusion of a user's experience or paid resource experience (e.g., upon the user exiting the accessible resource facility or upon the user exiting the paid zone of the accessible resource facility). Accordingly, where the user is relinquishing access to a nested resource or a parallel resource and continuing to access another resource (e.g., a higher level resource), processing at block 409 for exiting this particular resource may not result in payment processing (e.g., the user may be advised of the costs incurred, without yet being presented with an invoice or a solicitation for payment). However, where the user is relinquishing access to a highest level resource of a paid zone (e.g., library 221 of paid zone 220) or otherwise exiting a paid zone, processing at block 409 may result in payment processing for all the resources utilized during the user's experience. As another example, where the user is relinquishing access to a last resource of an accessible resource facility, whether in a paid zone or free zone, (e.g., lounge 211 of accessible resource facility 110) or otherwise ending their current experience, processing at block 409 may result in payment processing for all the resources utilized during the user's experience. Of course, embodiments may operate to provide payment processing at other times, such as upon exit/relinquishment of any paid zone resource, periodically (e.g., daily, weekly, monthly, yearly, etc.), etc., as desired.

Payment processing according to embodiments may comprise presenting information regarding the user's utilization of resources, solicit the user's confirmation of the charges, collect payment information and/or authorization, submit a payment transfer request, and/or the like. For example, resource server 120 may compile information regarding the utilization of resources by the user (e.g., particular resources utilized, times/duration of utilization, etc.). Using such utilization information, resource server 120 may access a user account information database providing information regarding user accounts and rates to generate a report or invoice for the resource utilization. Such a report may be provided to the user for review and acceptance and/or to payment gateway 130 for submission of a payment transfer request. Payment gateway 130 may, for example, access a user account information database providing information user payment information providing information regarding methods of payment and payment accounting, payment processing information providing information for processing payments, etc. and interact with an appropriate payment processing facility (e.g., payment processing facility 140) to request transfer of funds in payment for the user's utilization of resources. Payment gateway 130 of embodiments may thus interface into an ecommerce platform (e.g., infrastructure provided by an ecommerce service provider, such as BRAINTREE) for facilitating payment fulfilment.

Although the foregoing payment processing has been described with respect to the user's utilization of resources, it should be appreciated that such payment processing may be provided with respect to the sale and/or distribution of various consumable items in association with point of sale 231. For example, the user's acquisition of various consumable items from point of sale 231 may be tracked by resource server 120, as discussed above with respect to the utilization of resources, and thus included in a resource utilization report and payment fulfillment at block 409 of embodiments. Alternatively, payment processing with respect to such consumable items may be provided at the point of sale (e.g., as the consumable items are obtained by the user), using processing by resource server 120 and/or payment gateway 130 as described above.

It should be appreciated that, although the foregoing operation of a resource utilization management system for a user (e.g., "member" user) keying in or out of a resource has been described with reference to a user's own use of the resource(s), embodiments may provide resource access with respect to one or more other users, such as by or on behalf of a member user. For example, a member user (e.g., a user having the capability and/or authority to himself/herself directly and independently access managed resources of an accessible resource facility) may invite another user (e.g., "guest" user) to either access the resource in accompaniment of the member user or perhaps in the member user's stead. In accordance with embodiments, such a member user may, when accessing a resource, when reserving a resource, etc., designate that a guest user is to have access to the resource, perhaps providing identification information of the guest user. The member user may, in operation according to embodiments, be charged for the guest user's utilization of the resource(s), such as at a highest level resource rate for the guest user's access. The guest user of embodiments may not have a resource key device, and thus may rely upon the member user to key the guest user in and/or out of the resource(s). For example, the member user's resource key device may include a selection (e.g., software enabled button) to check their guest into and out of any resources when the member user accesses or relinquishes the resource (s). Additionally or alternatively, the guest user may be provided a resource key device (e.g., through downloading an applet on the gust user's smart phone or other processor-based device), or perhaps a limited function resource key device such as may be tied to the member user's account and/or resource key device, to facilitate the guest user keying in and/or out of resource(s) designated by the member user.

Figure 5:
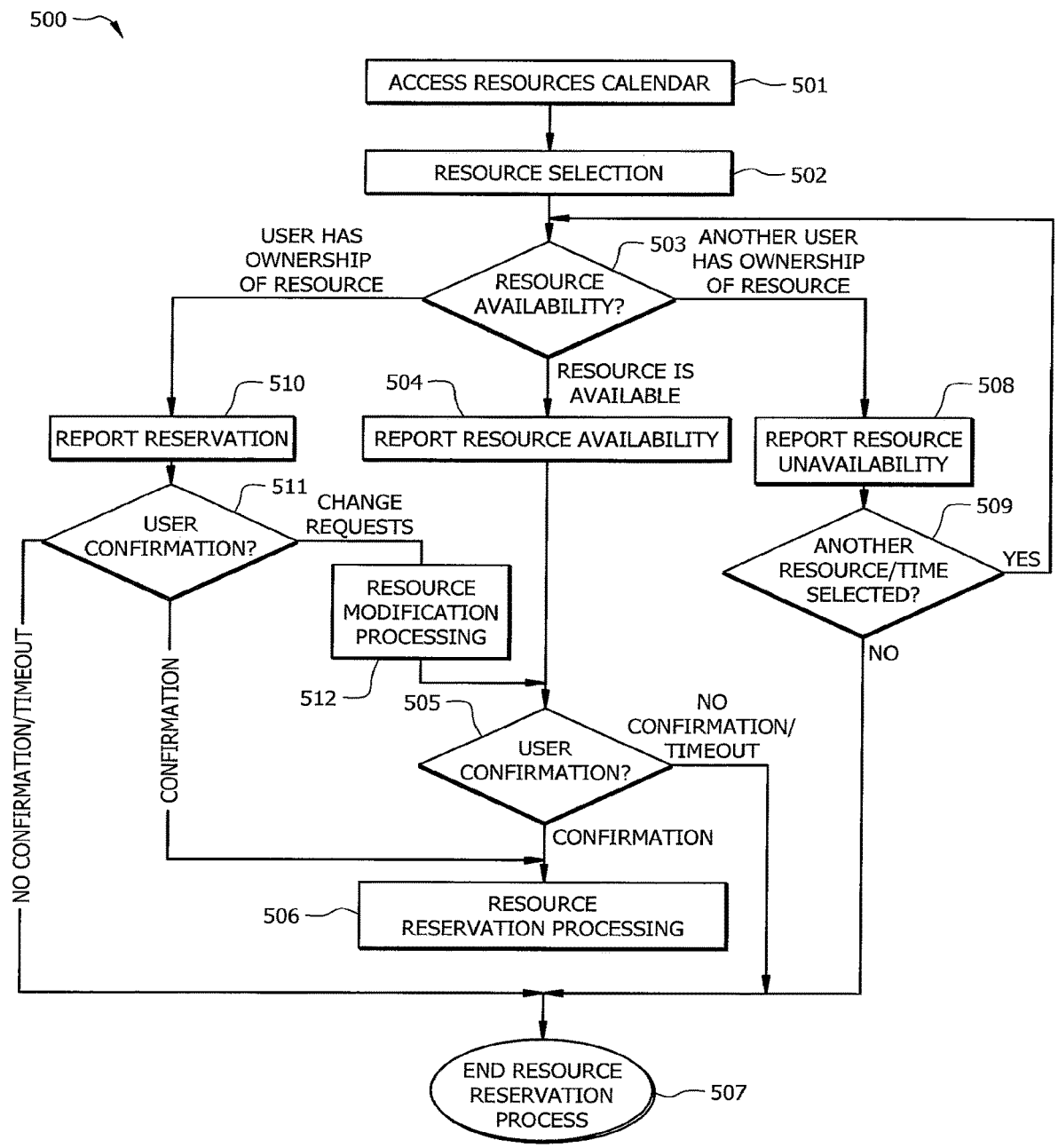
FIG. 5 shows a high level flow diagram showing resource reservation operation of a resource utilization management system according to embodiments of the present invention.

Having described operation of a resource utilization management system of embodiments herein with respect to a user keying in or out of a resource, reference is now made to FIG. 5 wherein a high level flow diagram showing operation of a resource reservation process of a resource utilization management system is provided in flow 500. The resource reservation process of flow 500 may, for example, be utilized to reserve one or more resources in advance to thereby provide "ownership" and ensure availability of the resource to the reserving user. For example, a user may access the resource reservation process remotely with respect to the resource(s) being reserved (e.g., when not present at a resource location, such as accessible resource facility 110), such as through interaction of resource key device 101 and/or user terminal 102 with resource server 120 via network 150. Additionally or alternatively, a user may access the resource reservation process locally with respect to the resource(s) being reserved (e.g., when attempting to access a resource currently in use by another user and thus reserving the resource at a later time, when wishing to reserve a resource for future use, etc.), such as through interaction of resource key device 101 with resource server 120 and/or user terminal 102 via network 150.

At block 501 a resource calendar, or other resource availability information resource, is accessed for use in determining the availability of one or more resource. For example, a resource database providing information regarding the resources of the resource utilization management system, accessible to resource server 120, may store information regarding the current and planned (e.g., reserved) utilization of various resources. This information may be organized into a calendar format, or other suitable format, for presentation to a user for identifying one or more resources and available time meeting the user's need or desires.

In operation, a user may identify a particular resource the user wishes to reserve access for and availability information for that particular resource may be accessed and a resource availability calendar generated. Additionally or alternatively, a user may identify a class of resources, particular attributes or amenities desired with respect to a resource, a particular location for a resource, etc. and availability information for one or more resources meeting or most nearly meeting the identified information may be accessed and a resource availability calendar generated. It should be appreciated that a particular resource, or even resources in a class of resources, identified by a user may not be available at a time or within a time window desired by the user, accordingly embodiments of the invention herein may operate to provide availability information with respect to alternative resources (e.g., other resources available at a desired time, at a desired location, having one or more attribute meeting that indicated by the user, etc.).

At block 502 of the illustrated embodiment, having been provided with resource availability information, the user indicates a selection of a resource the user wishes to reserve for their later use. Such selection of a resource may comprise identifying the particular resource or perhaps designating a class of resources for which one or more resources meeting the user's needs are available. Such selection of a resource may further include a desired time window for the use of the resource (e.g., a date and particular time of day, such as may include a starting time and ending time or starting time and length of use period, for the reservation). Additional information may also be provided by the user to aid in establishing a reservation of resources suitable to the user. For example, the user may identify particular nested resources or resource amenities that the user wishes to be available to the user during the proposed reservation.

It should be appreciated that, in the situation where the user is attempting ad hoc access to a resource that is already in use or reserved by another user, operation of the resource reservation process may be provided for facilitating reserving of the resource (or another resource), such as at a later time. Accordingly, resource selection at block 502 of embodiments may, for example, comprise the user selecting an alternative time for the particular resource for which the ad hoc access had been attempted. For example, the resource calendar information accessed at block 501 may provide the user with the available times of the resource for the user to select a time (e.g., a next available time) for their use of the resource. Additionally or alternatively, resource selection operation at block 502 may utilize information regarding resource availability accessed at block 501 to provide the user with the ability to select another (e.g., alternative) resource, such as a same or similar resource having immediate availability or availability sooner than the resource for which ad hoc access was attempted.

Processing according to the illustrated embodiment of flow 500 then proceeds to block 503 wherein a determination with respect to the availability of the particular resource, or a resource meeting the user's selections, is made. In operation according to embodiments, resource server 120 may utilize information from the user's selection at block 502 to identify a resource that the user has selected for reserving and to determine the state of the resource (e.g., using resource identification information to access a resource database storing utilization state information). As will be more fully described below, a resource may be available to the user, already reserved by the user, or the resource may be unavailable to the user (e.g., a shared resource reserved by a capacity number of users already or an exclusive resource reserved by another user).

Accordingly, resource server 120 may operate to determine if the subject resource is currently in an "available" state or an "unavailable" state. Where the resource is indicated as being in an available state for the proposed reservation period (e.g., using a resource information database available to resource server 120), the resource may be determined to be available to the user. In contrast, where the resource is indicated as being in an unavailable state for the proposed reservation period (e.g., using the resource information database), the resource may be determined to be unavailable to the user. If, for example, the resource is reserved for another user during the proposed reservation period, the resource may be determined to be unavailable to the user. However, where the resource is indicated as already being reserved to the user for the proposed reservation period (e.g., using the resource information database), further processing may be performed to determine if the user wishes to alter or cancel the reservation.

In operation according to embodiments, a report regarding the availability state of the resource is provided in response to the resource reservation selection at block 503. For example, resource server 120 may provide an affirmative report (e.g., the aforementioned Y-report), a negative report (e.g., the aforementioned N-report), or an exit report (e.g., the aforementioned E-report) regarding the availability state of the resource, such as to resource key device 101 or user terminal 102, for further processing according to flow 500 of the illustrated embodiment.

Assuming that it is determined that the resource is available for the proposed reservation period at block 503, processing according to the illustrated embodiment proceeds to block 504 wherein an affirmative report is provided. For example, resource server 120 may provide a Y-report to resource key device 101 or user terminal 102, such as via network 150, to indicate that the subject resource is available to the user for the proposed reservation period.

Having been provided an affirmative report with respect to the resource, processing according to the illustrated embodiment proceeds to block 505 for user confirmation of the desire to reserve the resource for the proposed reservation period. For example, resource key device 101 or user terminal 102 may, upon receiving a Y-report in response to the resource reservation selection, display a query to the user to ask the user to confirm that the user wishes to reserve the resource for the proposed reservation period, requiring a response from the user (e.g., manipulation of a resource key device button or touch screen, shaking of a resource key device having motion sensing capability, a voice response to an audio input of the resource key device, etc.) to assent to the resource reservation.

The aforementioned user confirmation, in addition to providing the aforementioned "two-tap" confirmation, may be utilized to present information to the user regarding the resource and receive acknowledgment of the information by the user. For example, the affirmative report may include various information regarding the resource reservation, such as pricing information for the use of the resource as applicable to the user (e.g., global pricing information where such pricing is applicable to the user, group pricing information where the user is a member of a particular group of users, or individual pricing information when such pricing is applicable to the user), information regarding modification or cancellation of the resource reservation, information regarding amenities of the resource, nested or parallel resources available with respect to the reserved resource, rewards/loyalty points to be awarded for use of the resource, rewards/loyalty points available for redemption toward use of the resource, and/or the like, which may be presented to the user by the resource key device or other user terminal in a user confirmation process according to embodiments. Where, for example, a user has not designated a ending time for the reservation or has otherwise not indicated a reservation period (e.g., the user may have indicated a starting time but not an ending time for the reservation) the aforementioned additional information may include a default time (e.g., 15 minutes) for the user's reservation of the resource. This information may be presented to the user for confirmation and/or user selection of a different time (e.g., increase/decrease the default time, perhaps in predetermined increments of time).

As previously discussed, operation at block 505 of the illustrated embodiment provides for user confirmation of the desire to reserve resource. In operation according to the illustrated embodiment, should the user respond to the confirmation in the negative (i.e., indicate that reservation of the resource is not desired) or fail to respond to the confirmation in the affirmative (i.e., indicate that reservation of the resource is desired) within some predetermined period of time (e.g., confirmation time-out threshold) the reservation of the resource to the user will not be made and processing proceeds to block 507 where the resource reservation process of the illustrated embodiment terminates. Such operation provides for avoiding accidental or unwanted reservation of resources. Accordingly, embodiments preferably implement the aforementioned user confirmation processing, or some other form of reservation confirmation. It should be appreciated, however, that the aforementioned user confirmation process may be omitted or different than that shown, according to embodiments. For example, a user may respond to the confirmation in the negative (i.e., decline the resource reservation) not because the user does not wish to reserve the resource, but because some aspect of the resource reservation offered for confirmation is not suitable to the user (e.g., a default reservation period is insufficient for the user's needs). Accordingly, rather than proceeding to block 507 to end the resource reservation process, embodiments may query the user as to whether the proposed reservation should be altered, whereby an affirmative response may repeat the resource reservation process or some portion thereof (e.g., returning to block 501) and a negative response may proceed to block 507 to end the resource reservation process.

Should the user respond to the confirmation at block 505 in the affirmative (i.e., indicate that reservation of the resource is desired), processing according to the illustrated embodiment proceeds to block 506 wherein resource reservation processing is performed. For example, resource key device 101 or user terminal 102 may provide a Y-report to resource server 120 indicating the user's confirmation of the resource reservation. Resource server 120 may then update the state of the resource for the reservation period (e.g., using resource identification information to access a resource database storing utilization state information) to reflect the reservation. Likewise, resource server 120 may update information of a user account information database to reflect the reservation.

Resource reservation processing may comprise various control and/or messaging operations. For example, resource server 120 may provide a message to resource key device 101 and/or user terminal 102 indicating that the resource reservation has been granted, providing cancellation policy information, etc. Such control or messaging may be provided to devices and/or subsystems in addition to or in the alternative to the aforementioned resource key device and other user terminals. For example, resource server 120 may provide control signals to the subject resource itself, or some subsystem thereof, to facilitate access and/or use by the user during the reservation period. As another example, resource server 120 may provide control and/or messaging signals to one or more information UI (e.g., an information UI of information UIs 202a-202f associated with the reserved resource) to control display of the "reserved" status of the resource, the time period of the reservation, etc. It should be appreciated that the control of such an information UI to display such information regarding the resource reservation, as well as the in-use status information discussed above, facilitates ad hoc access to the resource by the users of the resource utilization management system, as well as general transparency with respect to the use and enjoyment of resources of the resource utilization management system.

Having described processing according to flow 500 for the situation where a resource is determined to be available in response to a user resource reservation operation according to the embodiment illustrated in FIG. 5, reference is again made to the determination made at block 503. If, rather than it being determined that the resource is available at block 503, it is determined that the resource is unavailable to the requesting user (e.g., due the resource being "owned" by another user, the resource being at capacity through reservation by other users, etc.), processing according to the illustrated embodiment proceeds to block 508 for resource unavailability processing.

At block 508 of embodiments, a negative report is provided. For example, resource server 120 may provide a N-report to resource key device 101 or user terminal 102, such as via network 150, to indicate that the resource is unavailable for reservation to the user. Such a N-report may include various information (e.g., resource information, resource access availability information, pricing information, information regarding other resources, such as alternative resources, nested resources, parallel resources, etc.) to facilitate operation as described herein.

Having been provided a negative report with respect to the resource, processing according to the illustrated embodiment proceeds to block 509 for user selection of a different resource and/or a different, available time. For example, resource key device 101 or user terminal 102 may, upon receiving a N-report in response to a resource reservation selection, display information regarding availability of one or more other resource, one or more time the subject resource or another resource is available, etc. Additionally or alternatively, information regarding alternative resources (e.g., resources of a same class, a similar class, having the same or similar features, nearby in proximity, etc.) which are available during the proposed reservation period, or which are scheduled to become available near the proposed reservation period, may likewise be provided in the N-report and correspondingly a message displayed to the user regarding their availability. The information regarding such alternative resources (the alternative resources including an alternative available time for the subject resource) provided to the user may include information in addition to identification of the particular alternative resources available.

Operation at block 509 according to embodiments, having been presented with alternative resource availability information, as described above, may proceed to query the user regarding whether the user wishes to perform resource reservation processing with respect to one or more of the alternatives. For example, the user may be enabled to select a particular alternative resource/time (e.g., through manipulation of a resource key device button or touch screen, a voice response to an audio input of the resource key device, etc.) to select a desired alternative resources. Where the user elects to perform resource reservation processing with respect to an alternative, processing according to the illustrated embodiment proceeds to return to block 503 wherein this resource is availability is confirmed and remains available for the user. Further processing as described herein with respect to the resource reservation may thus be provided. However, where the user does not elect to perform resource reservation processing with respect to an alternative resource/time, processing according to the illustrated embodiment proceeds to block 507 where the resource reservation process of the illustrated embodiment terminates.

Having described processing according to flow 500 for the situations where a resource is determined to be available or unavailable in response to a user resource reservation operation according to the embodiment illustrated in FIG. 5, reference is again made to the determination made at block 503. If it is determined that the user has already reserved the resource for the reservation period, operation according to the illustrated embodiment operates under the presumption that the user may wish to relinquish the reservation of that resource or modify that resource reservation in some way and thus proceeds to block 510.

At block 510 of flow 500 of FIG. 5, resource reservation relinquishment/modification processing is initiated. For example, resource server 120 may generate a reservation report for facilitating cancellation of the user's resource reservation or the user's modification of the resource reservation. Such a reservation report may, for example, include information regarding the resource reserved, the period of the reservation, the cost for utilization of the resource during the reservation period, amenities and/or other resources available with respect to the resource of the resource reservation, the further availability of the resource for reserving by the user, etc. A reservation report may be provided by resource server 120 to resource key device 101 and/or user terminal 102 for resource reservation relinquishment/modification confirmation and/or other resource reservation processing operation.

Having been provided resource reservation information, processing according to the illustrated embodiment proceeds to block 511 for user confirmation of the desire to relinquish the reservation or to indicate a desire to modify the reservation. For example, resource key device 101 or user terminal 102 may, upon receiving a reservation-report, display a message to the user regarding the user already having a reservation with respect to the subject resource and to query to the user regarding whether the user would like to relinquish the resource reservation or if the user would like to modify the resource reservation. In operation according to embodiments, a response is solicited from the user (e.g., manipulation of a resource key device button or touch screen, shaking of a resource key device having motion sensing capability, a voice response to an audio input of the resource key device, etc.) to avoid accidently or unintentionally relinquishing the resource reservation.

If, for example, the user either fails to respond to the query or responds to the query in the negative (i.e., indicating the user does not wish to relinquish or modify the resource reservation), processing according to the illustrated embodiment proceeds to block 507 wherein where the resource reservation process of the illustrated embodiment terminates (i.e., the existing resource reservation remains unchanged). For example, resource key device 101 or user terminal 102 may provide a N-report to resource server 120 indicating the user's desire to continue to hold the resource reservation.

If, at block 511, the user responds to the query in the affirmative with respect to relinquishing the resource reservation (i.e., indicating assent to relinquishment of the resource reservation), processing according to the illustrated embodiment proceeds to block 506 for resource reservation processing, as described above. For example, resource key device 101 or user terminal 102 may provide a Y-report to resource server 120 indicating the user's confirmation of resource reservation cancellation. Resource server 120 may then update the state of the resource for the reservation period (e.g., using resource identification information to access a resource database storing utilization state information) to reflect the reservation having been cancelled and the resource thus being available. Likewise, resource server 120 may update information of a user account information database to reflect the reservation cancellation.

It should be appreciated that the resource reservation processing provided in association with relinquishing a resource reservation may comprise various control and/or messaging operations. For example, resource server 120 may provide a message to resource key device 101 and/or user terminal 102 indicating that the resource reservation has been cancelled, providing cancellation fee information where appropriate, etc. Such control or messaging may be provided to devices and/or subsystems, such as to one or more information UI (e.g., an information UI of information UIs 202a-202f associated with the reserved resource) to control display of the "reserved" status of the resource to reflect the cancellation of the reservation and the availability of the resource, etc.

If, however, the user responds to the query in the affirmative with respect to modifying the resource reservation (i.e., indicating a desire to modify the resource reservation in some regard) at block 511, processing according to the illustrated embodiment proceeds to block 512 for resource reservation modification processing. For example, resource key device 101 or user terminal 102 may provide a Y-report to resource server 120 indicating the user's confirmation of resource reservation modification. Resource reservation modification processing at block 512 operates to obtain information regarding one or more aspect of the reservation to be changed or modified, such as to provide operation similar to that described above with respect to resource selection processing at block 502. Additionally, resource reservation modification processing at block 512 of embodiments may operate to verify resource availability with respect to the modified reservation, such as to provide operation similar to that described above with respect to resource availability processing at block 503. Where the resource as per the modified resource reservation remains available to the user, processing according to embodiments proceeds to block 505 for further processing as described above. It should be appreciated that, where the resource as per the modified resource reservation is not available to the user, operation at block 512 may report the resource unavailability and query the user regarding selection of another resource/time for the reservation, similar to operation as described above with respect to blocks 508 and 509.

Having made a resource reservation, such as in accordance with flow 500 described above, a user is preferably provided "ownership" of the reserved during the reservation period and thus is assured access to the resource as reserved. The user may access the reserved resource during the reservation period using a key-in process, such as described above with respect to flow 400 of FIG. 4. Where a user fails to key-in at a reserved resource to thus initiate access thereto, embodiments may operate to provide signaling to remind the user of their "ownership" of the resource. For example, resource sever 120, upon determining that a user has not accessed a reserved resource at the beginning of a reservation period, may send a message to resource key device 101 and/or user terminal 102 to alert the user. Such a message may provide various information to the user, such as to identify the reserved resource, the reservation period, the fees incurred by the user's "ownership" but non-use of the resource, a procedure for releasing the resource reservation should it no longer be needed or desired, etc. The user may thus proceed to access the reserved resource, release the resource for use by others, etc. Where the user fails to take action in response to such a message, embodiments may operate to maintain the user's "ownership" of the resource throughout the resource reservation period, to thereby facilitate late arrivals and ensure availability to the user of the resource throughout the resource reservation period. Alternatively, embodiments may operate to release the user's "ownership" of the resource if the user fails to either access the resource or respond to the reminder message, such as after holding the reservation open for some threshold period of time, to thereby facilitate minimizing charges to the user for an unused resource and to make the unused resource available to other users of the resource utilization management system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method, comprising:
   receiving, at a resource server, a first request message from a first portable user device to obtain entry to a specific space resource, the request message including data from a first scan of a resource tag physically affixed in proximity to the specific space resource and scanned by the first portable user device, the request message including date and time information;
   in response to the first request message, determining, by the resource server, that the specific space resource is available at the requested date and time;
   reporting the availability of the specific space resource from the resource server to the first portable user device;
   receiving, at the resource server, a confirmation message from the first portable user device that access to the specific space resource is confirmed;
   receiving, at the resource server from the first portable user device, user information regarding the user of the first portable user device;
   at the resource server, sending an access message to the first portable user device confirming that the specific space resource is reserved for the first user, and to permit entry to the specific space resource; and
   based on the user information, and the date and time information in the first request message, at the resource server, initiating a transaction to charge the user of the first portable user device for utilization of the accessed space resource.

2. The method of claim 1, wherein the data from the scanned resource tag identifies the specific space resource or a location of the specific space resource.

3. The method of claim 2, further comprising:
   identifying a plurality of features of the specific space resource based on the location of the specific space resource; and
   providing a list of the features of the specific space resource to the first portable user device.

4. The method of claim 1, further comprising:
   in response to the first request message, determining, by the resource server, that the specific space resource is not available at the requested date and time; and
   sending an access message from the resource server to the first portable user device indicating that the specific space resource is reserved for another user, and to block entry to the specific space resource.

5. The method of claim 1, further comprising:
   receiving, at a resource server, a second request message from a second portable user device to obtain entry to the specific space resource, the second request message including data from the resource tag physically affixed in proximity to the specific space resource and scanned by the second portable user device, the second request message including date and time information; and
   transmitting, by the resource server to the second portable user device, a message denying access to the specific space resource when another user has been granted access to the specific space resource.

6. The method of claim 1, further comprising:
   receiving, at a resource server, a second request message from a second portable user device to obtain entry to the specific space resource, the second request message including data from the resource tag physically affixed in proximity to the specific space resource and scanned by the second portable user device, the second request message including date and time information; and
   when the specific space resource is configured as a shared resource, transmitting, by the resource server to the second portable user device, a message granting shared access to the specific space resource.

7. The method of claim 1, the step of reporting the availability of the specific space resource further comprising:
   identifying at least one nested resource associated with the specific space resource that is available for access.

8. The method of claim 7, further comprising:
   receiving, at the resource server from the first portable user device, a second request message to also obtain access to the nested resource; and
   granting access to the nested resource when access is granted to the specific space resource.

9. The method of claim 1, the step of reporting the availability of the specific space resource further comprising:
   identifying a plurality of features associated with the specific space resource.

10. The method of claim 9, the features including at least one equipment resource.

11. The method of claim 9, the features including at least one of: a nested resource; a parallel resource; an alternative resource; amenities associated with the specific space resource; available times for use of the specific space resource; and a pricing schedule for use of the specific resource.

12. The method of claim 1, further comprising:
    receiving data regarding environmental features of the specific space resource; and
    providing instructions to the first portable user device regarding how to make adjustments to the environmental features.

13. The method of claim 12, wherein the environmental data includes temperature and lighting associated with the specific space resource.

14. The method of claim 1, the reporting step further comprising:
    identifying an alternative space resource that is available at the requested date and time when the specific space resource is not available.

15. The method of claim 1, the reporting step further comprising:
    identifying at least one different date and time when the specific space resource is available.

16. The method of claim 1, further comprising:
    receiving, at the resource server from the first portable user device, a second request message including data from a second scan of the resource tag, the second request message indicating an exit from the specific space resource and terminating access to the specific space resource.

17. The method of claim 1, further comprising:

receiving, at the resource server from the first portable user device, a signal indicating an exit from the specific space resource and terminating access to the specific space resource.

18. A system, comprising:

a resource server having a processor configured to execute instructions; and a memory coupled to the resource server and having stored instructions that, when executed by the processor, cause the resource server to:

receive a first request message from a first portable user device to obtain entry to a specific space resource, the request message including data from a resource tag physically affixed in proximity to the specific space resource and scanned by the first portable user device, the request message including date and time information;

in response to the first request message, determine that the specific space resource is available at the requested date and time;

report the availability of the specific space resource to the first portable user device;

receive a confirmation message from the first portable user device that access to the specific space resource is confirmed;

receive user information regarding the user of the first portable user device from the first portable user device;

sending an access message to the controllably secured specific space resource to permit entry to the specific space resource; and based on the user information, and the date and time information in the first request message, initiating a transaction to charge the user of the first portable user device for utilization of the accessed space resource.

* * * * *